United States Patent
Misaka

(10) Patent No.: US 7,068,428 B2
(45) Date of Patent: Jun. 27, 2006

(54) ZOOM LENS SYSTEM AND IMAGING APPARATUS HAVING THE SAME

(75) Inventor: Makoto Misaka, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 34 days.

(21) Appl. No.: 11/064,814

(22) Filed: Feb. 24, 2005

(65) Prior Publication Data
US 2005/0190447 A1   Sep. 1, 2005

(30) Foreign Application Priority Data
Feb. 26, 2004   (JP) ............................. 2004-052205

(51) Int. Cl.
*G02B 27/64* (2006.01)
*G02B 15/14* (2006.01)

(52) U.S. Cl. ...................... 359/557; 359/554; 359/676

(58) Field of Classification Search ................ None
See application file for complete search history.

(56) References Cited

U.S. PATENT DOCUMENTS

| | | | |
|---|---|---|---|
| 5,270,857 A | 12/1993 | Oizumi | 359/554 |
| 5,504,626 A * | 4/1996 | Oshikiri | 359/689 |
| 5,731,897 A * | 3/1998 | Suzuki | 359/557 |
| 6,025,962 A | 2/2000 | Suzuki | 359/766 |
| 6,061,180 A * | 5/2000 | Hayakawa | 359/557 |
| 6,124,972 A * | 9/2000 | Hayakawa et al. | 359/557 |
| 6,891,680 B1 * | 5/2005 | Sato | 359/687 |
| 2002/0101661 A1 | 8/2002 | Harada | 359/557 |
| 2005/0275949 A1 * | 12/2005 | Fujimoto et al. | 359/685 |

FOREIGN PATENT DOCUMENTS

| | | | | |
|---|---|---|---|---|
| JP | 2-35406 A | 2/1990 | | |
| JP | 05-224160 A | 9/1993 | | |
| JP | 8-136862 A | 5/1996 | | |
| JP | 10-90601 A | 4/1998 | | |
| JP | 10-282413 A | 10/1998 | | |
| JP | 2001-75008 | * 3/2001 | ................. | 359/676 |
| JP | 2002-162564 A | 6/2002 | | |

* cited by examiner

*Primary Examiner*—Thong Q Nguyen
(74) *Attorney, Agent, or Firm*—Canon U.S.A., Inc. Intellectual Property Division

(57) ABSTRACT

A zoom lens system includes a front lens group and a rear lens group arranged from an object side to an image side in that order. The front lens group includes a plurality of lens units, and during zooming from a wide angle end to a telephoto end, imaging magnification is increased by changing spaces between the plurality of lens units. The rear lens group with positive optical power as a whole includes a lens unit IS with negative optical power being movable so as to have a direction perpendicular to an optical axis, and a lens component RB2 with positive optical power disposed on the image side with respect to the lens unit IS. A space between the lens unit IS and the lens component RB2 is changed during zooming. The following condition is established to satisfy:

$$0.05 < |fis|/ft < 0.25,$$

wherein (fis) denotes a focal distance of the lens unit IS, and (ft) denotes a focal distance at the telephoto end of the zooming lens system.

6 Claims, 21 Drawing Sheets

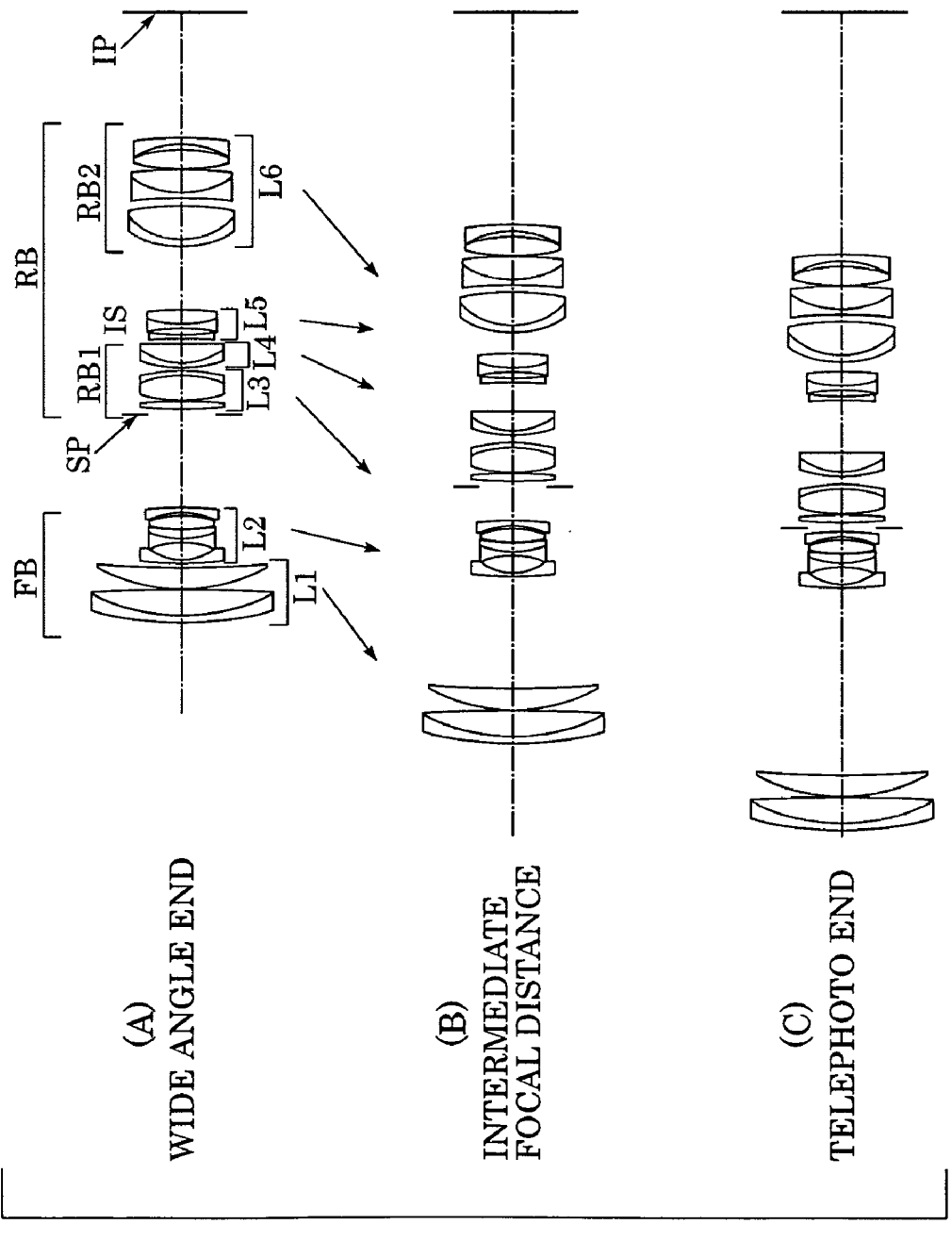

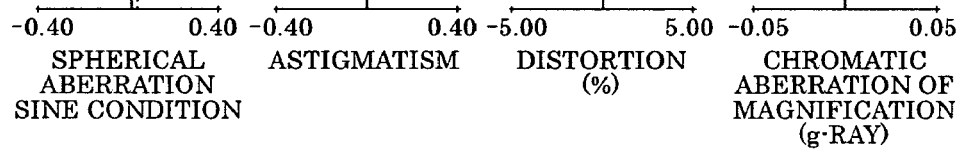

ZOOM LENS SYSTEM AND IMAGING APPARATUS HAVING THE SAME

BACKGROUND OF THE INVENTION

1. Field of the Invention

The present invention relates to a zoom lens system and an image pickup system having the zoom lens system, and in particular relates to a zoom lens system in which picked-up images are stabilized by optically correcting image deflection produced when the zoom lens system is vibrated (inclined). The zoom lens system according to the present invention is suitable for an imaging optical system, such as a silver-film camera, a video camera, and a digital still camera.

2. Description of the Related Art

If vibration is incidentally transmitted to an imaging system, image deflection is produced in picked-up images. Various zoom lenses having a mechanism to compensate for the image deflection due to the incidental vibration (image stabilizer) have been proposed. For example, an optical system is known in which part of a lens unit constituting an optical system (zoom lens) is moved in a direction substantially perpendicular to an optical axis so as to compensate for the image deflection due to vibration.

A zoom lens disclosed in Japanese Patent Laid-Open No. 2-35406 (corresponding to U.S. Pat. No. 5,270,857) is mainly suitable for a taking lens of lens shutter cameras. The reference discloses a configuration in which part of a 3-unit zoom lens composed of a first lens unit with negative refractive power, a second lens unit with positive refractive power, and a third lens unit with negative refractive power, which are arranged in that order from an object to the image side, is moved in a direction substantially perpendicular to an optical axis so as to compensate for image deflection.

A zoom lens disclosed in Japanese Patent Laid-Open No. 5-224160 is mainly suitable for a telephoto zoom lens of single lens reflex cameras. The reference discloses a configuration in which a 5-unit zoom lens is composed of a first lens unit with positive refractive power, a second lens unit with negative refractive power, a third lens unit with positive refractive power, a fourth lens unit with positive refractive power, and a fifth lens unit with positive refractive power, which are arranged in that order from an object to the image side. The units with negative refractive power are moved in a direction substantially perpendicular to an optical axis so as to compensate for image deflection.

A zoom lens disclosed in Japanese Patent Laid-Open No. 8-136862 (corresponding to U.S. Pat. No. 6,124,972) is mainly suitable for a standard zoom lens of single lens reflex cameras. The reference discloses a configuration in which a 4-unit zoom lens is composed of a first lens unit with positive refractive power, a second lens unit with negative refractive power, a third lens unit with positive refractive power, and a fourth lens unit with positive refractive power, which are arranged in that order from an object to the image side. The second lens unit is moved in a direction substantially perpendicular to an optical axis so as to compensate for image deflection.

A zoom lens disclosed in Japanese Patent Laid-Open No. 10-282413 (corresponding to U.S. Pat. No. 6,061,180) is mainly suitable for a standard zoom lens of single lens reflex cameras. The reference discloses a configuration in which a 6-unit zoom lens is composed of a first lens unit with positive refractive power, a second lens unit with positive refractive power, a third lens unit with negative refractive power, a fourth lens unit with positive refractive power, a fifth lens unit with negative refractive power, and a sixth lens unit with positive refractive power, which are arranged in that order from an object to the image side. The fifth lens unit is moved in a direction substantially perpendicular to an optical axis so as to compensate for image deflection.

A zoom lens disclosed in Japanese Patent Laid-Open No. 2002-162564 (corresponding to US Patent Application Publication No. 2002101661) is mainly suitable for a large-aperture telephoto zoom lens of single lens reflex cameras. The reference discloses a configuration in which a 5-unit zoom lens is composed of a first lens unit with positive refractive power, a second lens unit with positive refractive power, a third lens unit with negative refractive power, a fourth lens unit with positive refractive power, and a fifth lens unit with positive refractive power fixed during zooming, which are arranged in that order from an object to the image side. The fifth lens unit, composed of a lens subunit with negative refractive power and a lens subunit with positive refractive power, is moved in a direction substantially perpendicular to an optical axis so as to compensate for image deflection.

Japanese Patent Laid-Open No. 10-90601 (corresponding to U.S. Pat. No. 6,025,962) discloses a configuration in which a 5-unit zoom lens is composed of a first lens unit with positive refractive power, a second lens unit with negative refractive power, a third lens unit with positive refractive power, a fourth lens unit with negative refractive power, and a fifth lens unit with positive refractive power fixed during zooming, which are arranged in that order from an object to the image side. The fourth lens unit is moved in a direction substantially perpendicular to an optical axis so as to compensate for image deflection.

In general, a mechanism for obtaining still images by vibrating a lens unit of an imaging system so as to eliminate image deflection requires that a degree of correction of the image deflection be large, the displacement and the rotational displacement of a lens unit (image stabilizer lens unit) to be vibrated for correcting the image deflection be small, and the entire apparatus be small in size.

As is well known, if a large amount of decentration aberration is produced when the image stabilizing lens unit is decentered, images become obscure when the image deflection is corrected. Hence, in an optical system having an image stabilizing function, it is required that the amount of decentration aberration produced when the image stabilizing lens unit is decentered be small (Problem 1), and large image deflection can be corrected with a small displacement of the image stabilizing lens unit, i.e., the vibration-proof sensitivity (the ratio $\Delta X/\Delta H$ of the correction amount of image deflection $\Delta H$ to the unit displacement of the image stabilizing lens unit $\Delta H$) be large (Problem 2).

However, in a zoom lens with a high zoom ratio in which the focal distance at the telephoto end is large, solving Problems 1 and 2 has been difficult at the zooming position of the telephoto end.

When the zoom lens disclosed in Japanese Patent Laid-Open No. 2-35406 is applied to an interchangeable lens of single lens reflex cameras, the back focal distance may be insufficient for securing the driving space of a QR mirror (quick return mirror).

The zoom lens disclosed in Japanese Patent Laid-Open No. 8-136862 is a standard zoom lens mainly used for single lens reflex cameras; however, the entire configuration is composed of a 4-unit lens zoom lens, so that it is difficult to increase the zoom ratio.

The zoom lenses disclosed in Japanese Patent Laid-Open No. 10-90601, Japanese Patent Laid-Open No. 10-282413, and Japanese Patent Laid-Open No. 2002-162564 are respectively composed of a front lens group having variable power and a rear lens group with positive refractive power, so that the lens unit with negative refractive power in the subsequent units is moved, as an image stabilizing lens unit, in a direction substantially perpendicular to an optical axis so as to compensate for image deflection. This configuration is advantageous for miniaturizing the image stabilizing lens unit and securing the large vibration-proof sensitivity. The zoom lenses disclosed in Japanese Patent Laid-Open No. 5-224160 and Japanese Patent Laid-Open No. 2002-162564 are telephoto lenses and since the focal distance at the telephoto end is large, it has been difficult to apply these optical systems to a standard zoom lens.

Also Japanese Patent Laid-Open No. 10-282413 discloses a standard zoom lens including a wide angle range; however, it has been difficult to apply it to a zoom lens with a further larger focal length at the telephoto end. The zoom lens disclosed in Japanese Patent Laid-Open No. 2002-162564 has a small back focal distance, so that when it is applied to an interchangeable lens of single lens reflex cameras, the interference with the quick return mirror may be produced.

SUMMARY OF THE INVENTION

The present invention is directed to a zoom lens system capable of maintaining excellent optical performance over the entire zooming region even with a high zoom ratio and for obtaining excellent images even during vibration compensation. The present invention is also directed to an imaging apparatus incorporating the zoom lens system.

In one aspect of the present invention, a zoom lens system includes: a front lens group including a plurality of lens units, wherein during a zooming operation from the wide angle end to the telephoto end, where a space between two lens units of the plurality of lens units constituting the front lens group changes to facilitate increasing imaging magnification; and a rear lens group with positive optical power including an image stabilizing lens unit and a first lens component. The image stabilizing lens unit has negative optical power and is movable so as to have a component in a direction perpendicular to the optical axis. The first lens component has positive optical power. During the zooming operation, a space between the image stabilizing isolating lens unit and the first lens component changes. The front lens group and the rear lens group are disposed from the object side to the image side along the optical axis, respectively. The image stabilizing lens unit and the first lens component are disposed from the object side to the image side along the optical axis, respectively. A focal distance (fis) of the vibration isolating lens unit and a focal distance (ft) of the system at the telephoto end satisfy 0.05<|fis|/ft<0.25.

In another aspect of the present invention, a zoom lens system includes: a plurality of lens units. The plurality of lens units include: a first lens unit with positive optical power; a second lens unit with negative optical power; a third lens unit with positive optical power; a fourth lens unit with positive optical power; a fifth lens unit with negative optical power; and a sixth lens unit with positive optical power. The first through sixth lens units are disposed from the object side to the image side along the optical axis, respectively. Spaces are provided between adjacent lens units, wherein during a zooming operation, the spaces change. The fifth lens unit is movable so as to have a component in a direction perpendicular to the optical axis. A focal distance (fis) of the fifth lens unit and a focal distance (ft) of the zoom lens system at a telephoto end satisfy 0.05<|fis|/ft<0.25.

Further features and advantages of the present invention will become apparent from the following description of exemplary embodiments with reference to the attached drawings.

BRIEF DESCRIPTION OF THE DRAWINGS

FIG. 29 shows schematic drawings of a zoom lens system according to a fifth embodiment of the present invention.

FIG. 30 is a longitudinal aberration diagram of the zoom lens according to the fifth embodiment at the wide angle end under base conditions.

FIG. 31 is a lateral aberration diagram of the zoom lens according to the fifth embodiment at the wide angle end when the image position of an object at an infinite distance is displaced by a field angle of 0.3°.

DESCRIPTION OF THE EMBODIMENTS

Embodiments of a zoom lens system according to the present invention will be described below with reference to the drawings.

Figure 1:
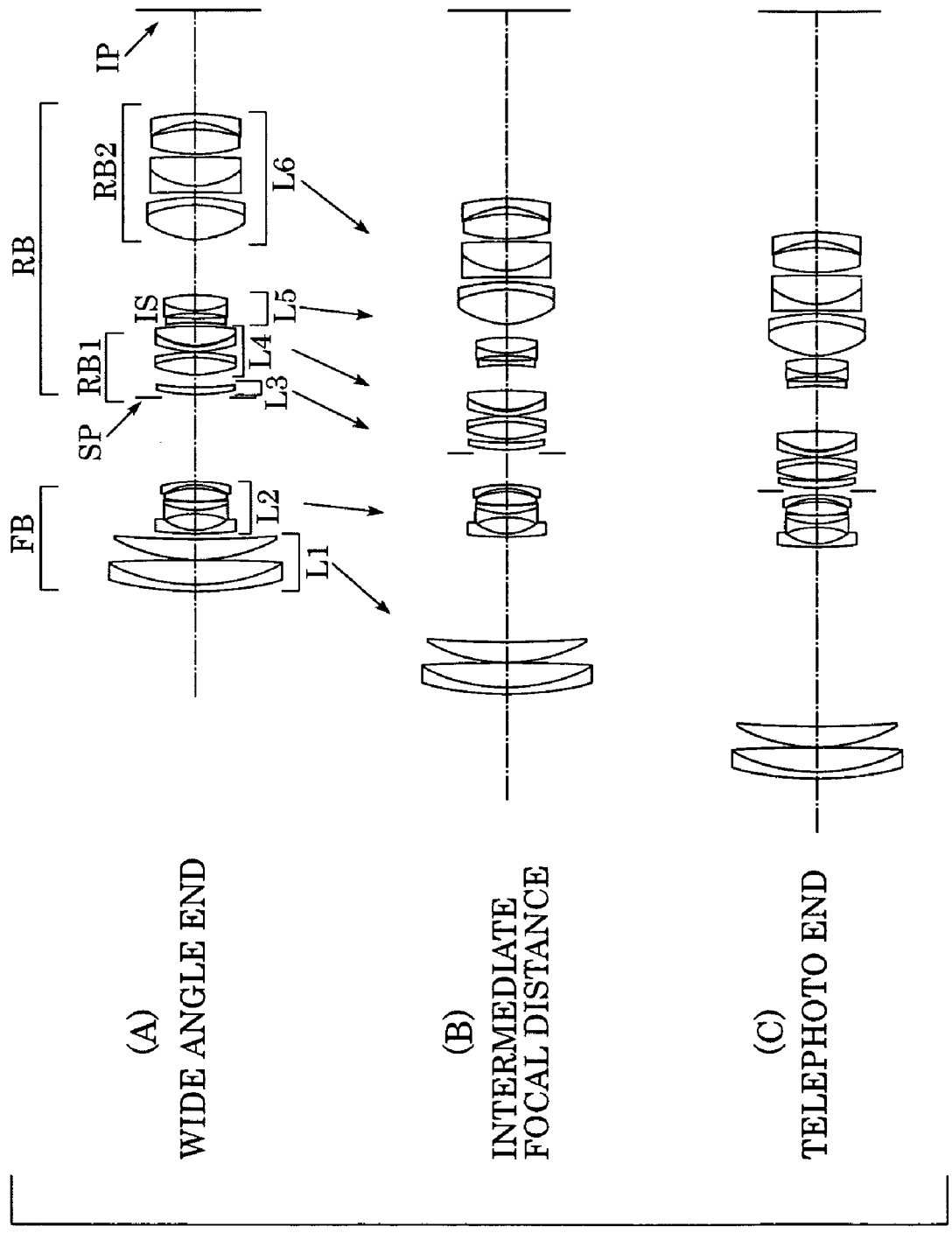
FIG. 1 shows schematic drawings of a zoom lens system according to a first embodiment of the present invention.
Figure 2:
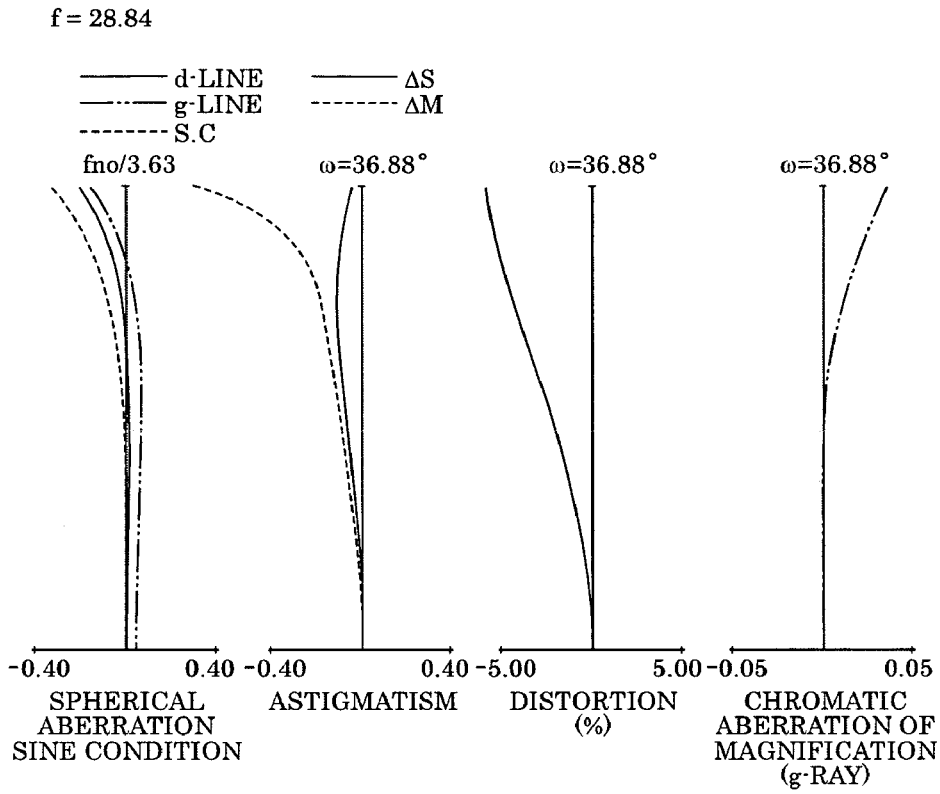
FIG. 2 is a longitudinal aberration diagram of the zoom lens according to the first embodiment at the wide angle end under base conditions.
Figure 3:
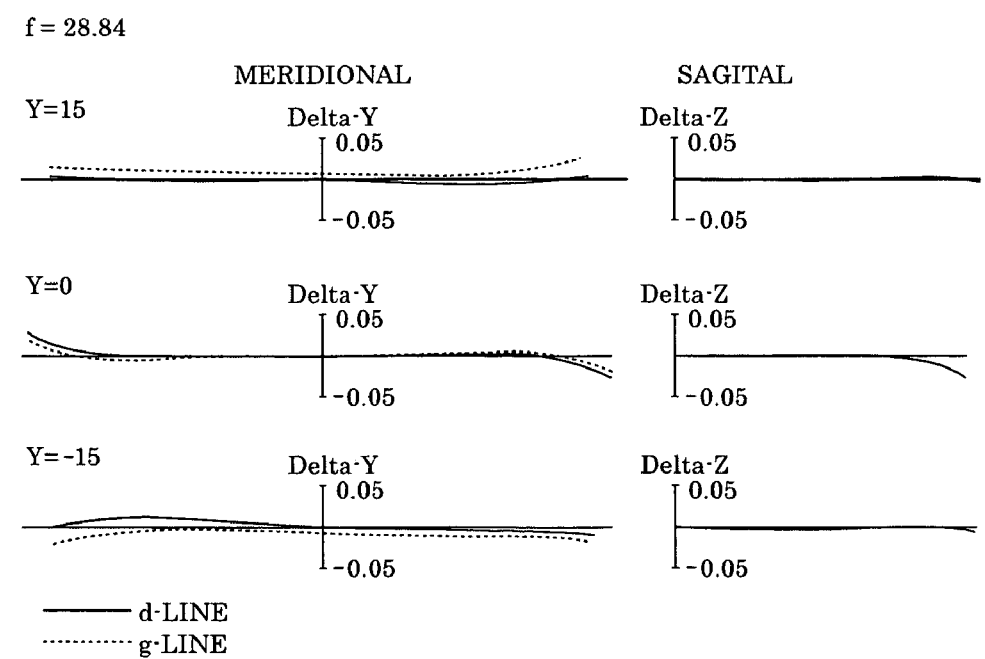
FIG. 3 is a lateral aberration diagram of the zoom lens according to the first embodiment at the wide angle end when the image position of an object at an infinite distance is displaced by an angle equivalent to a field angle of 0.3°.

FIG. 1 shows schematic drawings of a zoom lens according to a first embodiment of the present invention; FIG. 2 is a longitudinal aberration diagram of the zoom lens according to the first embodiment at the wide angle end under base conditions (the object is located at an infinite distance and the image stabilizing lens unit is not deflected in a direction perpendicular to an optical axis); and FIG. 3 is a lateral aberration diagram of the zoom lens according to the first embodiment at the wide angle end under vibration-proof conditions (the image position of the object at an infinite distance is displaced by an angle equivalent to a field angle of 0.3°).

Figure 4:
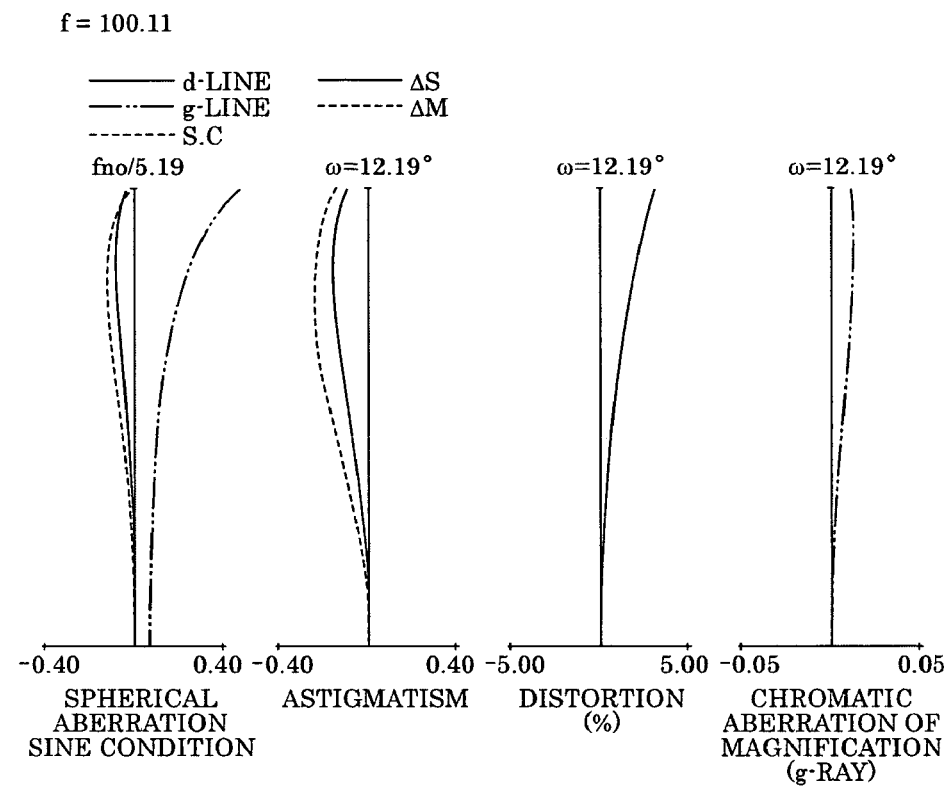
FIG. 4 is a longitudinal aberration diagram of the zoom lens according to the first embodiment at an intermediate zoom position under the base conditions.
Figure 5:
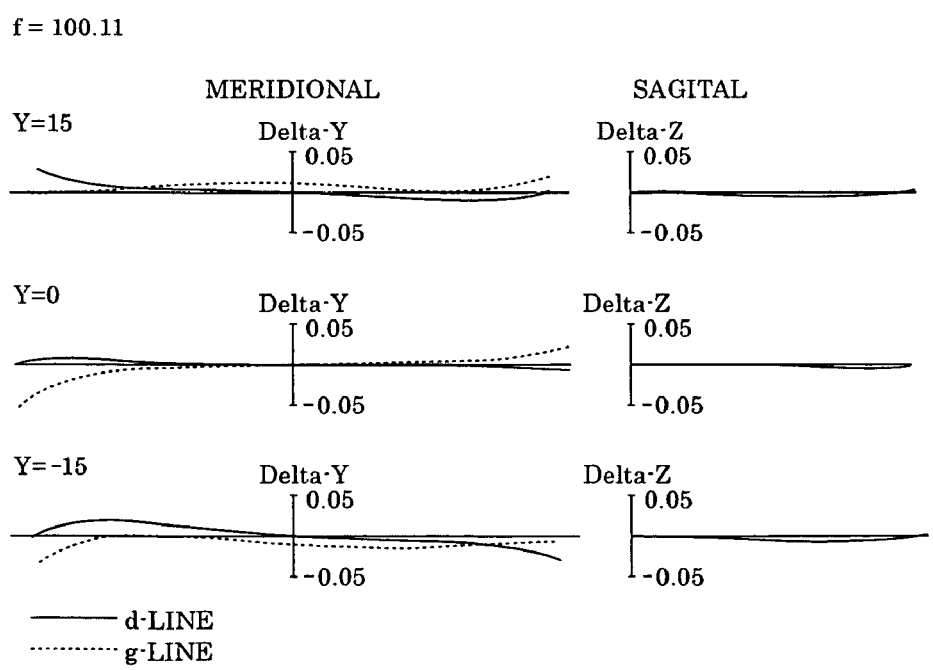
FIG. 5 is a lateral aberration diagram of the zoom lens according to the first embodiment at an intermediate zoom position when the image position of an object at an infinite distance is displaced by a field angle of 0.3°.

FIG. 4 is a longitudinal aberration diagram of the zoom lens according to the first embodiment at an intermediate zoom position under the base conditions; FIG. 5 is a lateral aberration diagram of the zoom lens according to the first embodiment at an intermediate zoom position under the vibration-proof conditions (the image position of the object at an infinite distance is displaced by an angle equivalent to a field angle of 0.3°).

Figure 6:
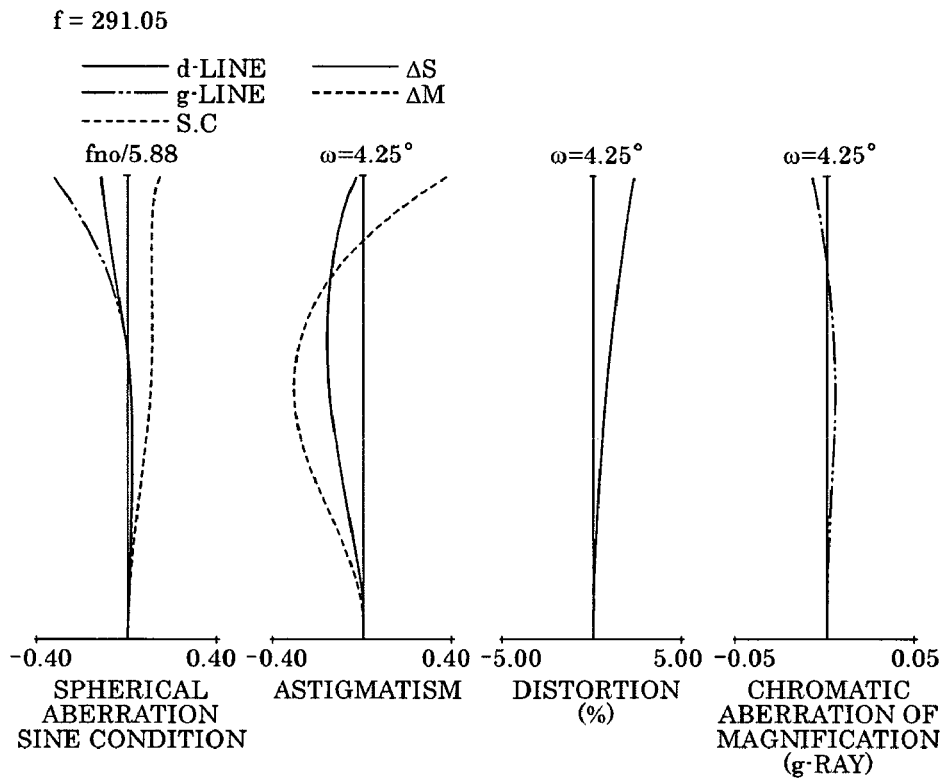
FIG. 6 is a longitudinal aberration diagram of the zoom lens according to the first embodiment at the telephoto end under the base conditions.
Figure 7:
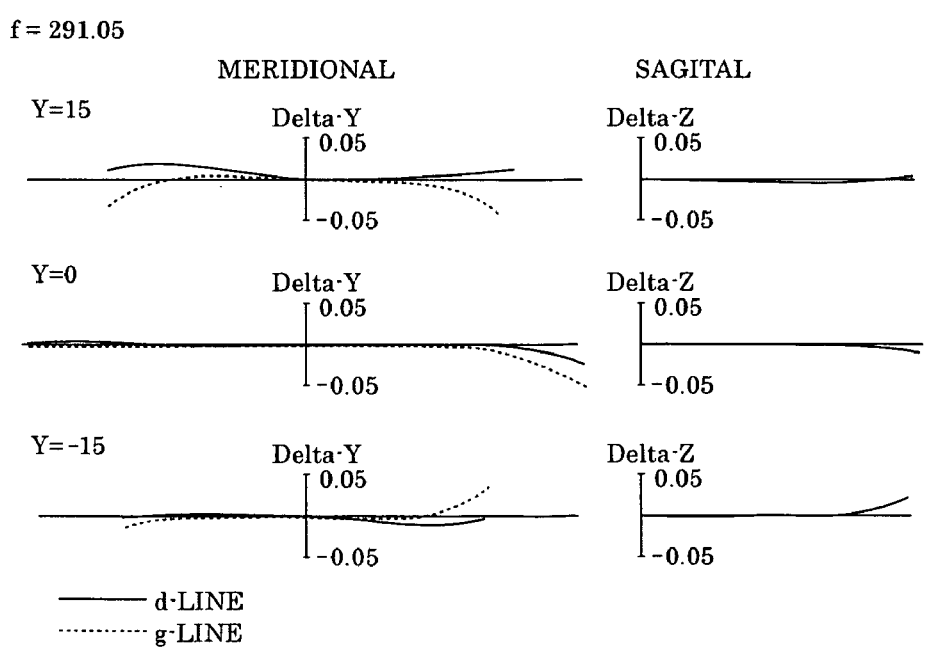
FIG. 7 is a lateral aberration diagram of the zoom lens according to the first embodiment at the telephoto end when the image position of an object at an infinite distance is displaced by a field angle of 0.3°.

FIG. 6 is a longitudinal aberration diagram of the zoom lens according to the first embodiment at the telephoto end under the base conditions; FIG. 7 is a lateral aberration diagram of the zoom lens according to the first embodiment at the telephoto end under the vibration-proof conditions (the image position of the object at an infinite distance is displaced by an angle equivalent to a field angle of 0.3°).

Figure 8:
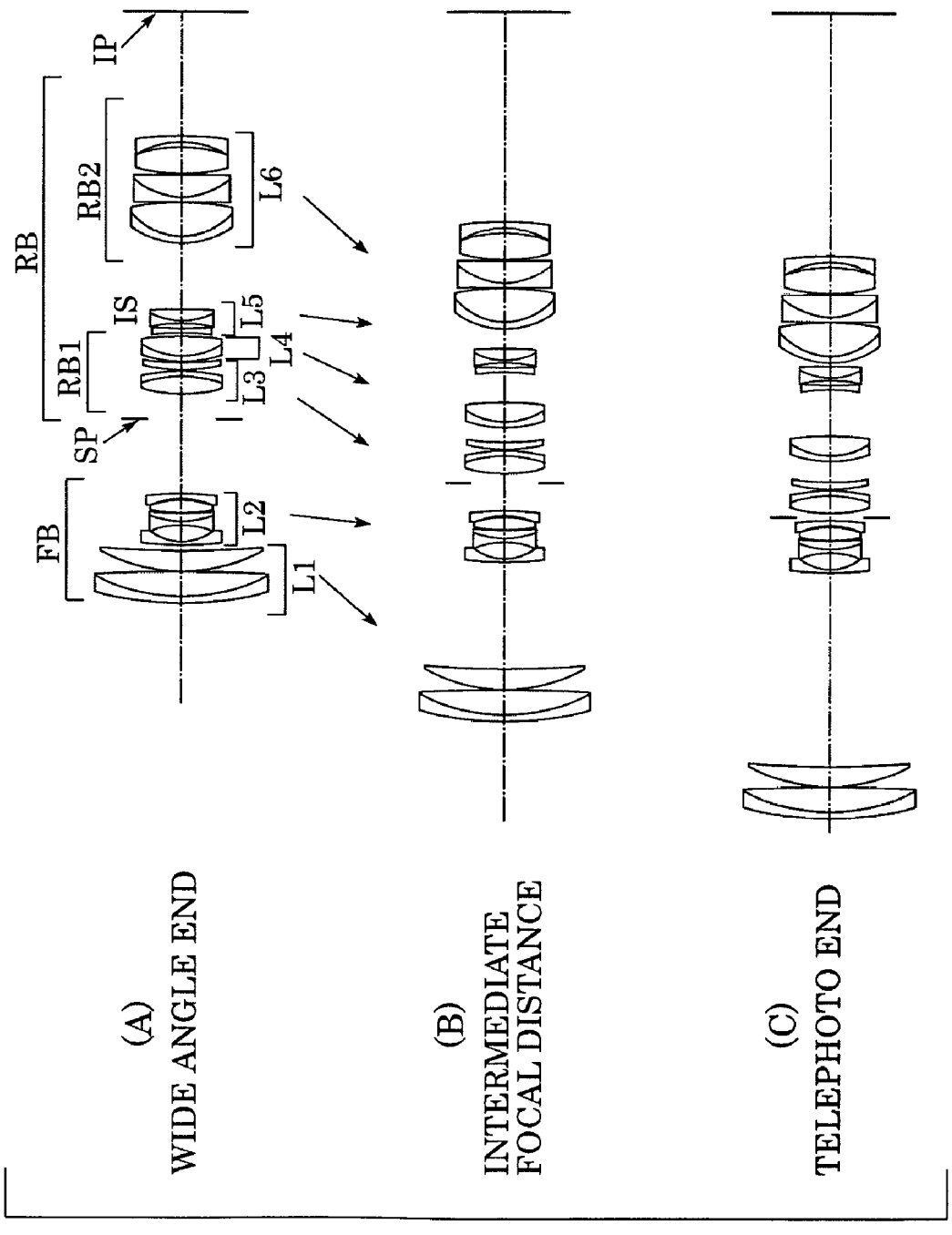
FIG. 8 shows schematic drawings of a zoom lens system according to a second embodiment of the present invention.
Figure 9:
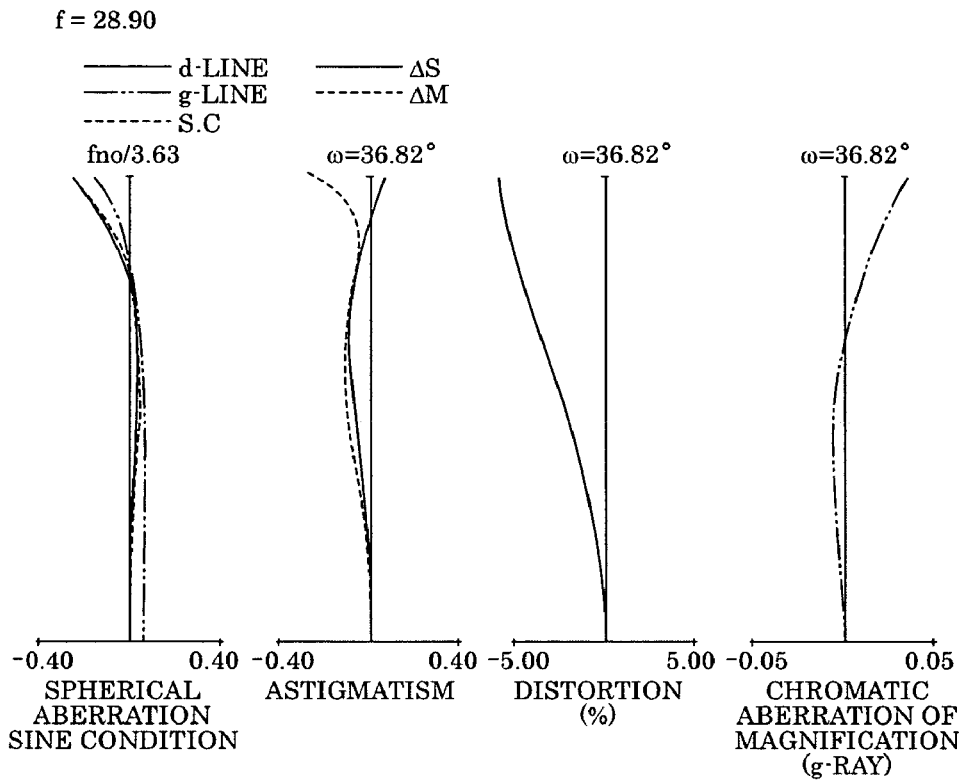
FIG. 9 is a longitudinal aberration diagram of the zoom lens according to the second embodiment at the wide angle end under base conditions.
Figure 10:
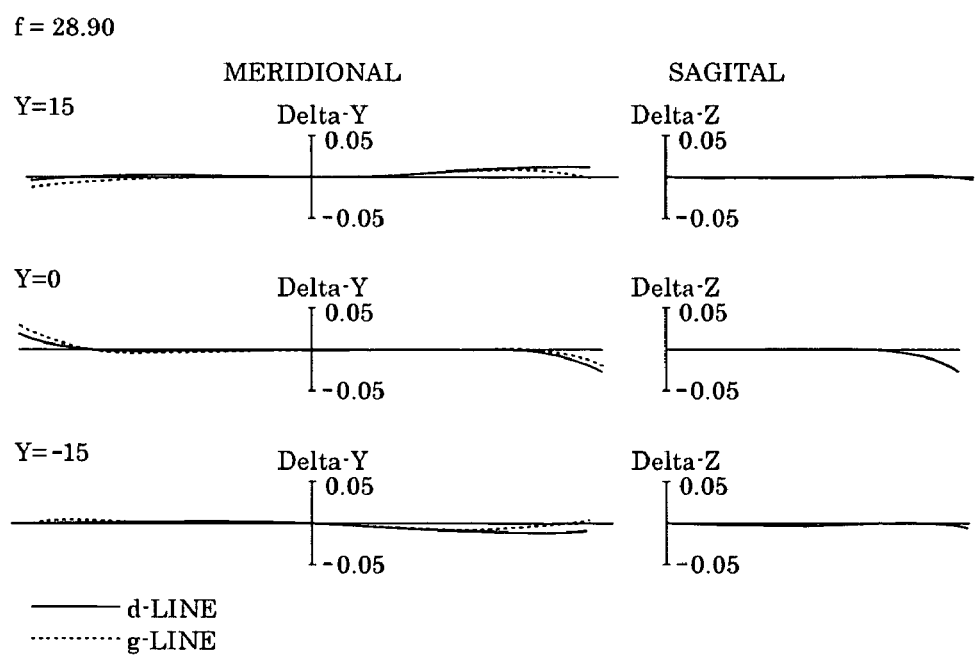
FIG. 10 is a lateral aberration diagram of the zoom lens according to the second embodiment at the wide angle end when the image position of an object at an infinite distance is displaced by a field angle of 0.3°.

FIG. 8 shows schematic drawings of a zoom lens according to a second embodiment of the present invention; FIG. 9 is a longitudinal aberration diagram of the zoom lens according to the second embodiment at the wide angle end under base conditions; and FIG. 10 is a lateral aberration diagram of the zoom lens according to the second embodiment at the wide angle end under vibration-proof conditions (the image position of the object at an infinite distance is displaced by an angle equivalent to a field angle of 0.3°).

Figure 11:
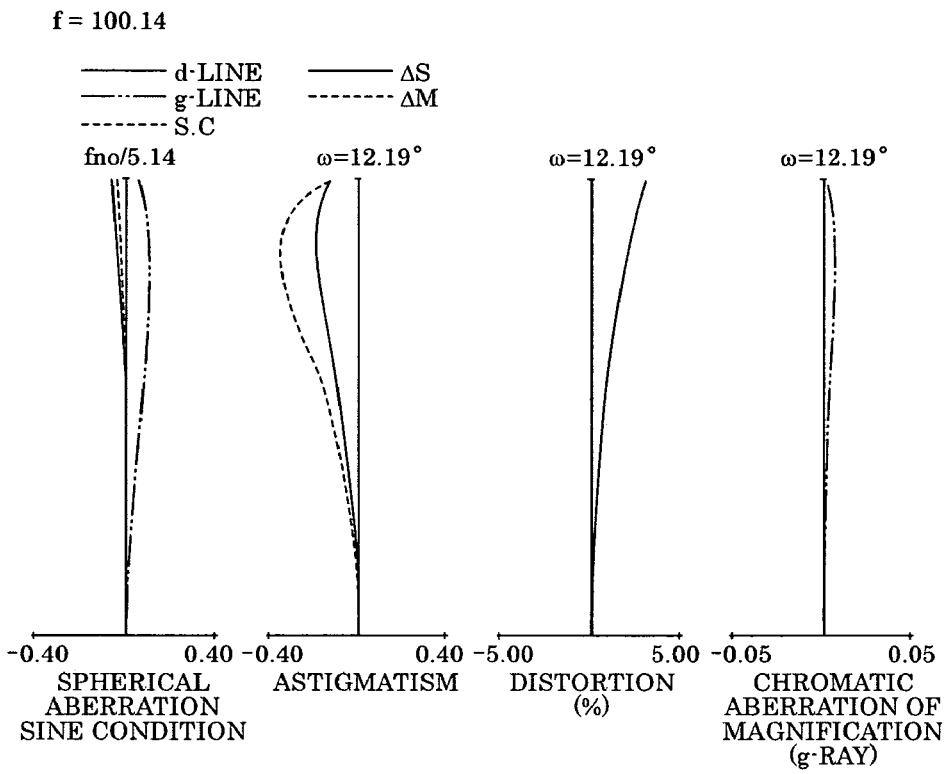
FIG. 11 is a longitudinal aberration diagram of the zoom lens according to the second embodiment at an intermediate zoom position under base conditions.
Figure 12:
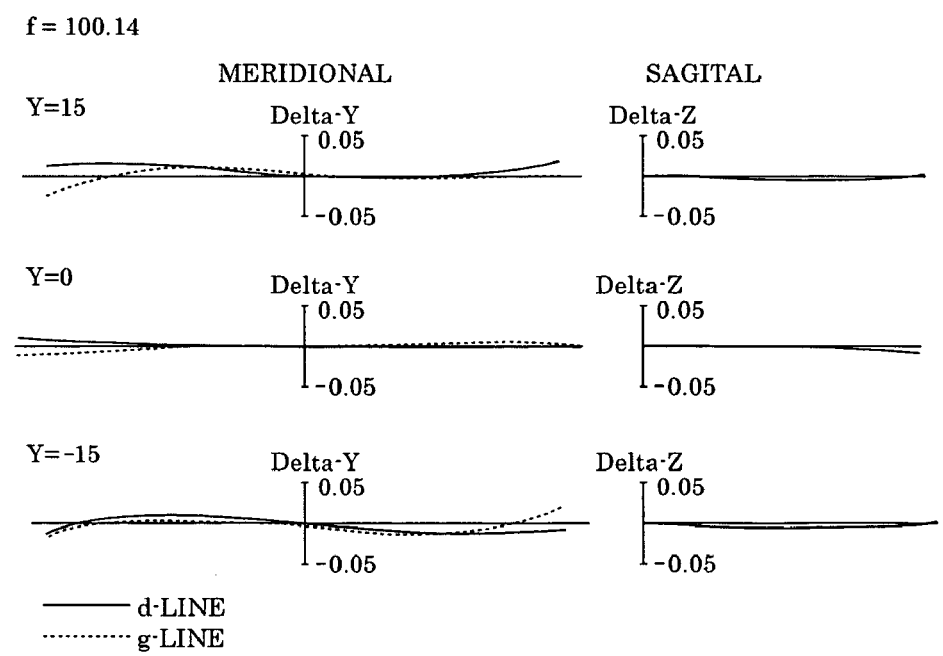
FIG. 12 is a lateral aberration diagram of the zoom lens according to the second embodiment at an intermediate zoom position when the image position of an object at an infinite distance is displaced by a field angle of 0.3°.

FIG. 11 is a longitudinal aberration diagram of the zoom lens according to the second embodiment at an intermediate zoom position under the base conditions; FIG. 12 is a lateral aberration diagram of the zoom lens according to the second embodiment at an intermediate zoom position under the vibration-proof conditions (the image position of the object at an infinite distance is displaced by an angle equivalent to a field angle of 0.3°).

Figure 13:
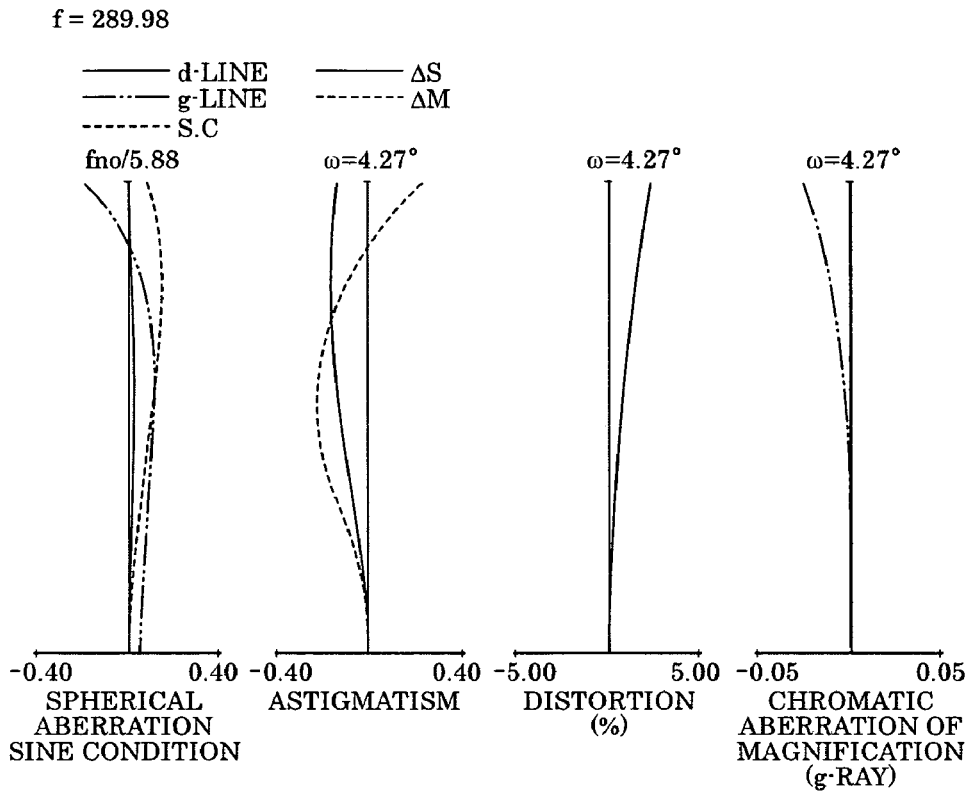
FIG. 13 is a longitudinal aberration diagram of the zoom lens according to the second embodiment at the telephoto end under base conditions.
Figure 14:
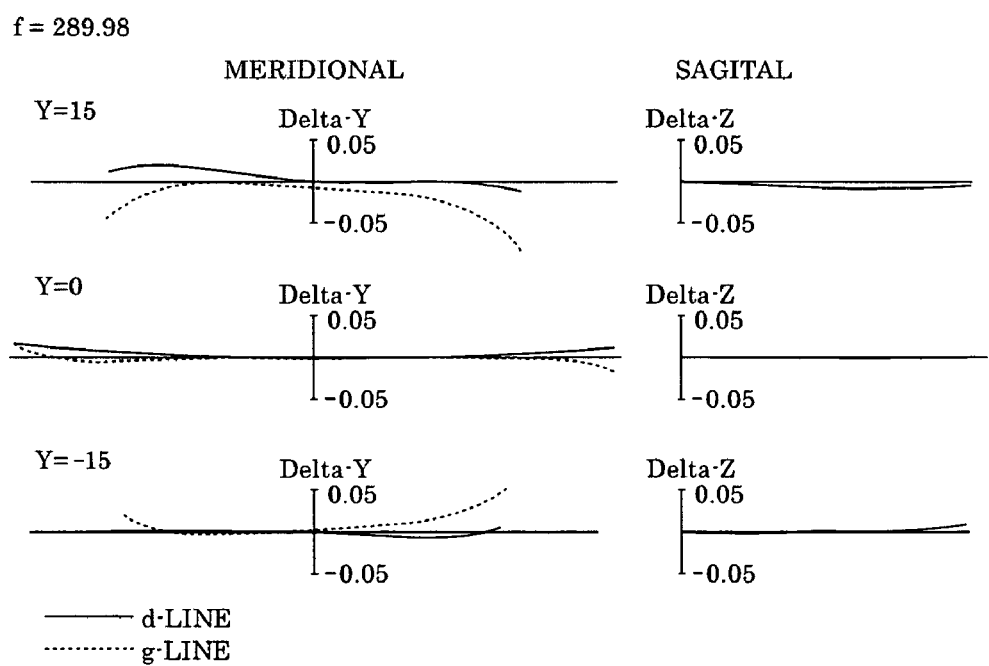
FIG. 14 is a lateral aberration diagram of the zoom lens according to the second embodiment at the telephoto end when the image position of an object at an infinite distance is displaced by a field angle of 0.3°.

FIG. 13 is a longitudinal aberration diagram of the zoom lens according to the second embodiment at the telephoto end under the base conditions; FIG. 14 is a lateral aberration diagram of the zoom lens according to the second embodiment at the telephoto end under the vibration-proof conditions (the image position of the object at an infinite distance is displaced by an angle equivalent to a field angle of 0.3°).

Figure 15:
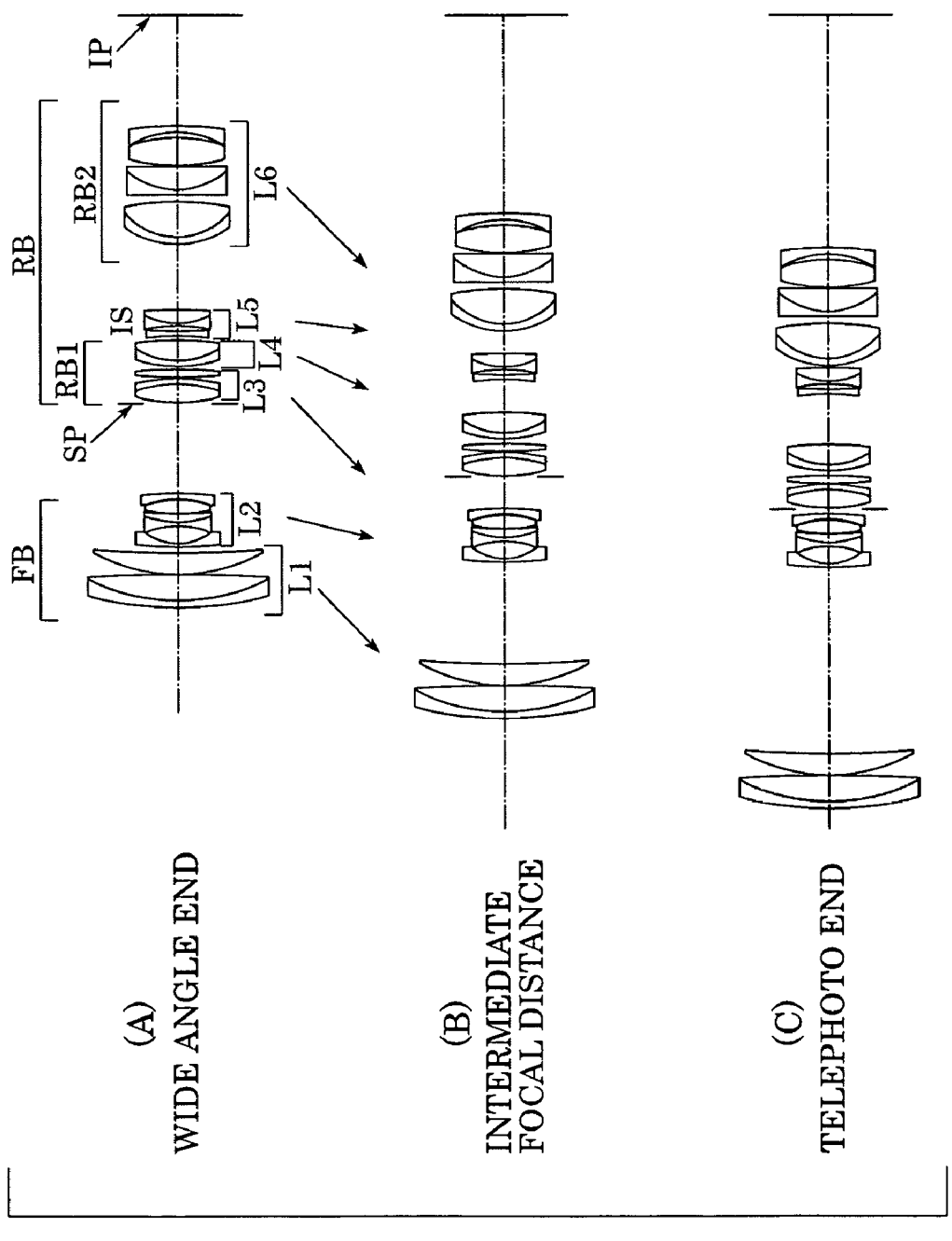
FIG. 15 shows schematic drawings of a zoom lens system according to a third embodiment of the present invention.
Figure 16:
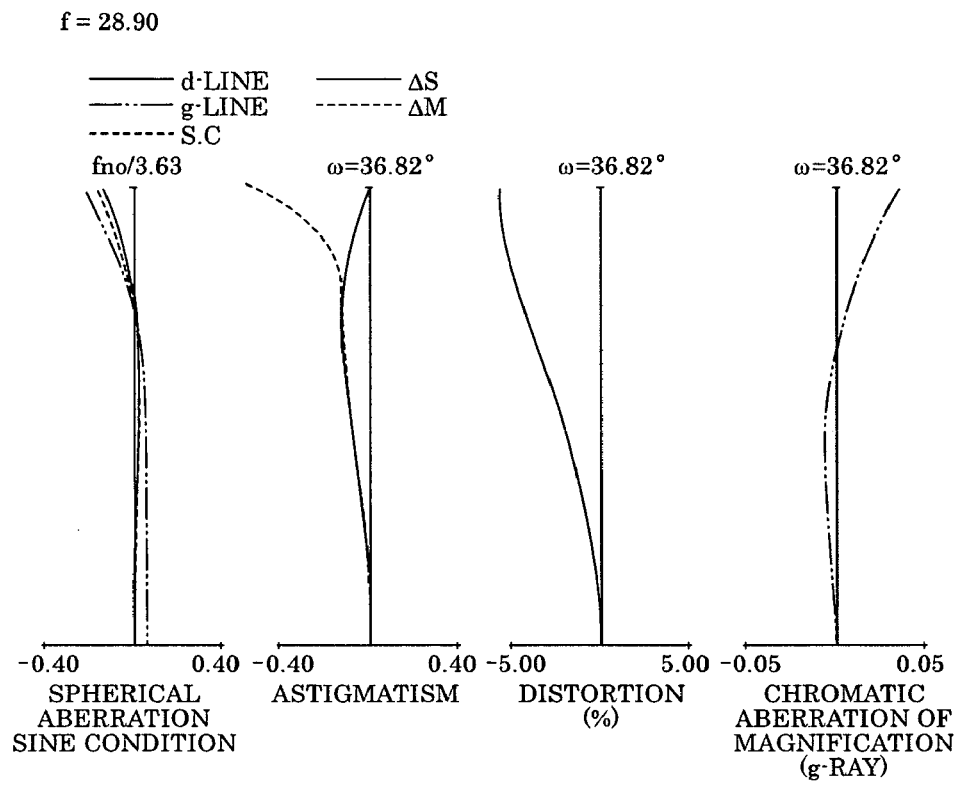
FIG. 16 is a longitudinal aberration diagram of the zoom lens according to the third embodiment at the wide angle end under base conditions.
Figure 17:
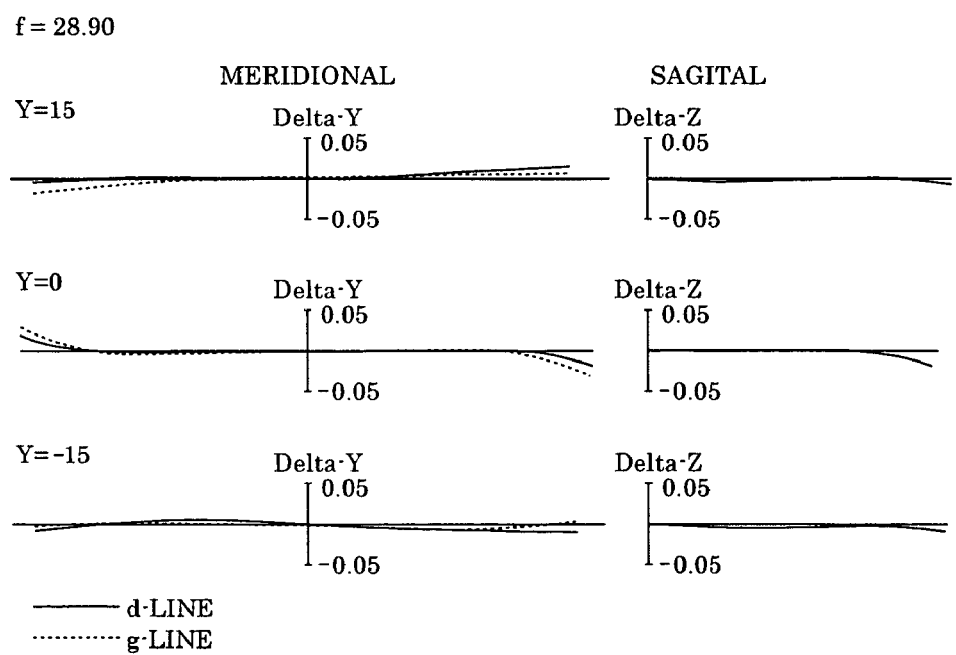
FIG. 17 is a lateral aberration diagram of the zoom lens according to the third embodiment at the wide angle end when the image position of an object at an infinite distance is displaced by a field angle of 0.3°.

FIG. 15 shows schematic drawings of a zoom lens according to a third embodiment of the present invention; FIG. 16 is a longitudinal aberration diagram of the zoom lens according to the third embodiment at the wide angle end under base conditions; and FIG. 17 is a lateral aberration diagram of the zoom lens according to the third embodiment at the wide angle end under vibration-proof conditions (the image position of the object at an infinite distance is displaced by an angle equivalent to a field angle of 0.3°).

Figure 18:
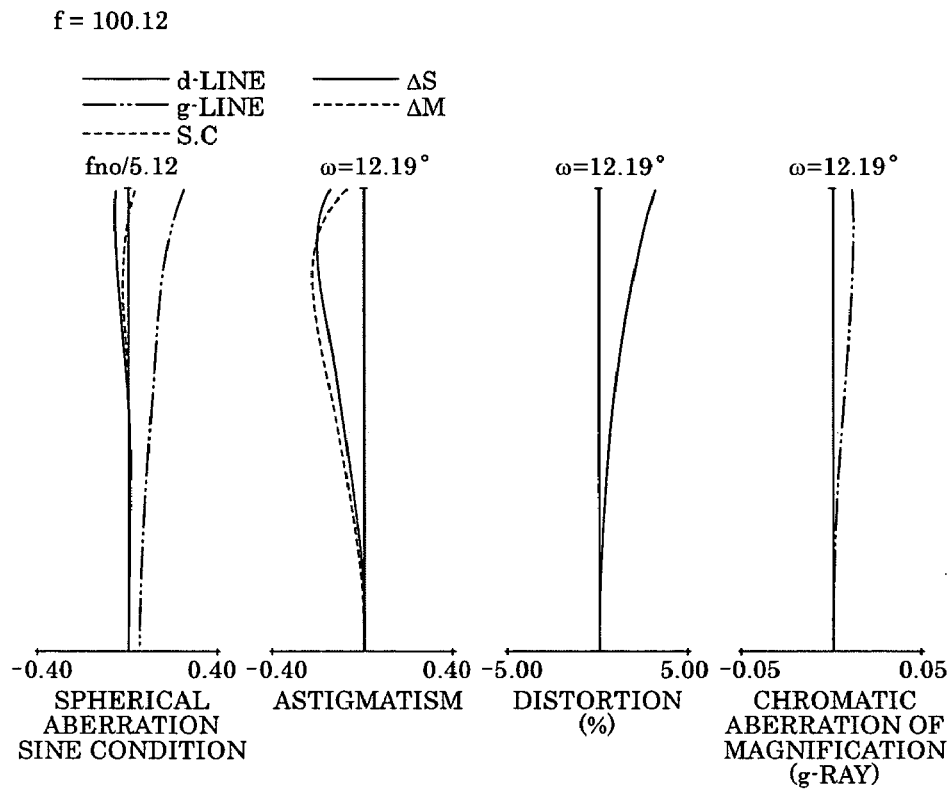
FIG. 18 is a longitudinal aberration diagram of the zoom lens according to the third embodiment at an intermediate zoom position under base conditions.
Figure 19:
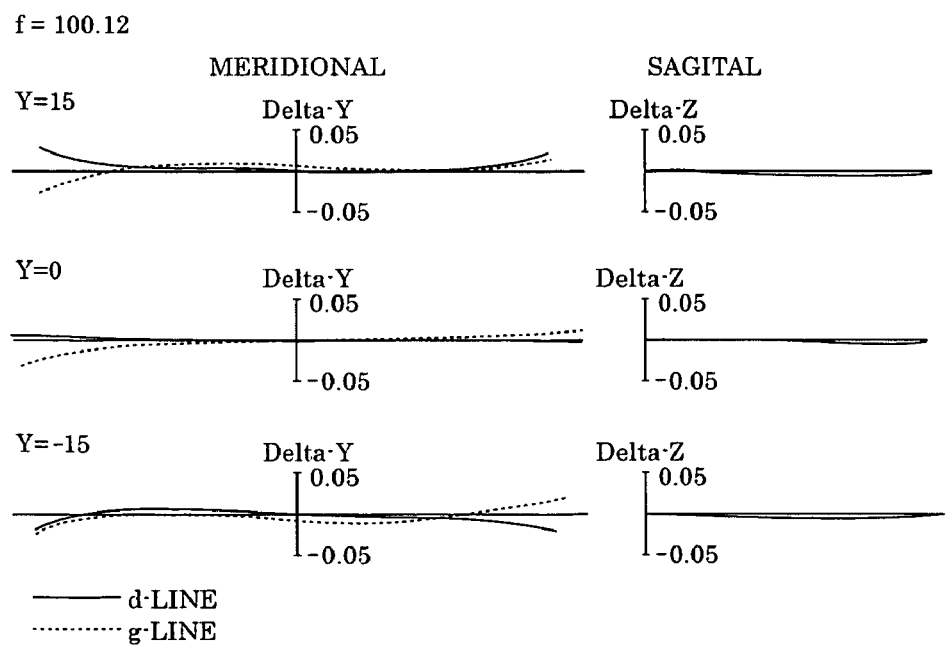
FIG. 19 is a lateral aberration diagram of the zoom lens according to the third embodiment at an intermediate zoom position when the image position of an object at an infinite distance is displaced by a field angle of 0.3°.

FIG. 18 is a longitudinal aberration diagram of the zoom lens according to the third embodiment at an intermediate zoom position under the base conditions; FIG. 19 is a lateral aberration diagram of the zoom lens according to the third embodiment at an intermediate zoom position under the vibration-proof conditions (the image position of the object at an infinite distance is displaced by an angle equivalent to a field angle of 0.3°).

Figure 20:
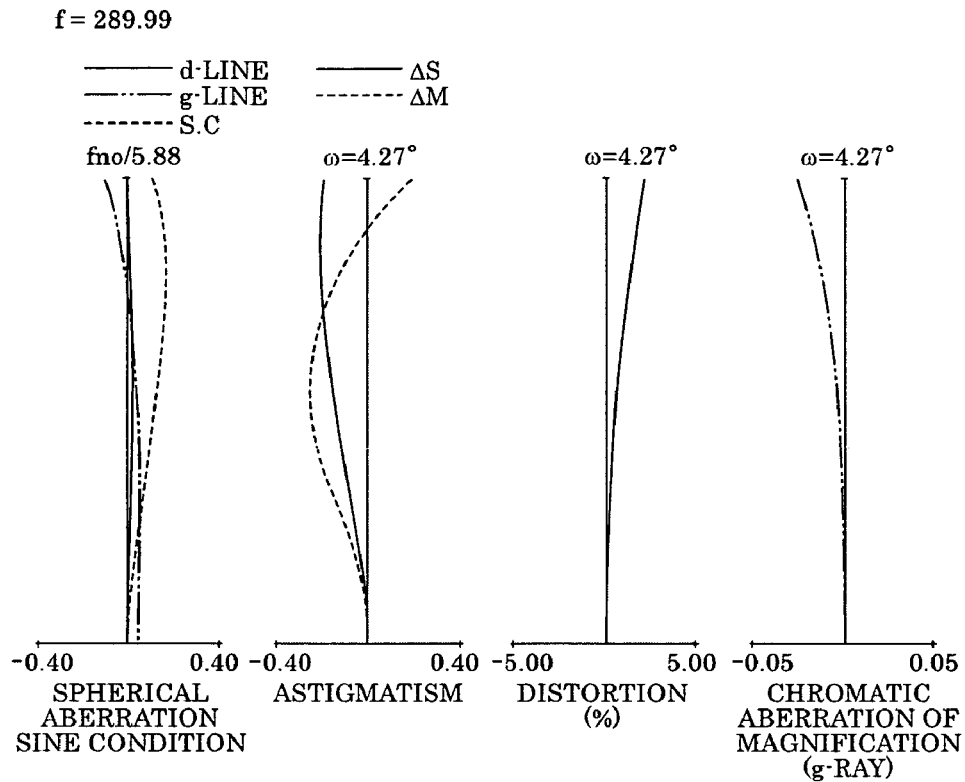
FIG. 20 is a longitudinal aberration diagram of the zoom lens according to the third embodiment at the telephoto end under base conditions.
Figure 21:
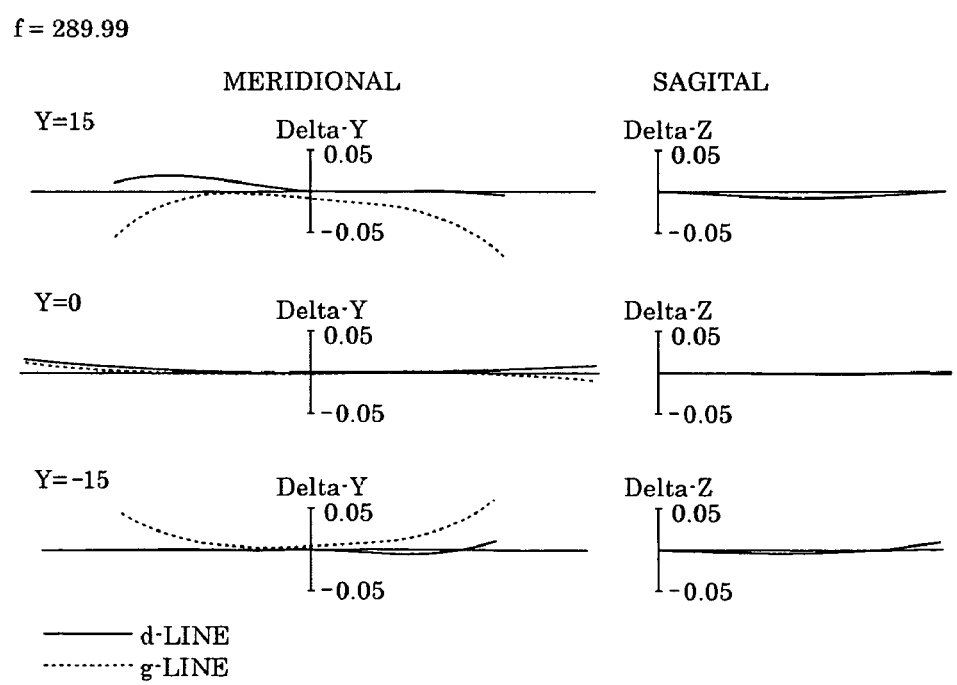
FIG. 21 is a lateral aberration diagram of the zoom lens according to the third embodiment at the telephoto end when the image position of an object at an infinite distance is displaced by a field angle of 0.3°.

FIG. 20 is a longitudinal aberration diagram of the zoom lens according to the third embodiment at the telephoto end under the base conditions; FIG. 21 is a lateral aberration diagram of the zoom lens according to the third embodiment at the telephoto end under the vibration-proof conditions (the image position of the object at an infinite distance is displaced by an angle equivalent to a field angle of 0.3°).

Figure 22:
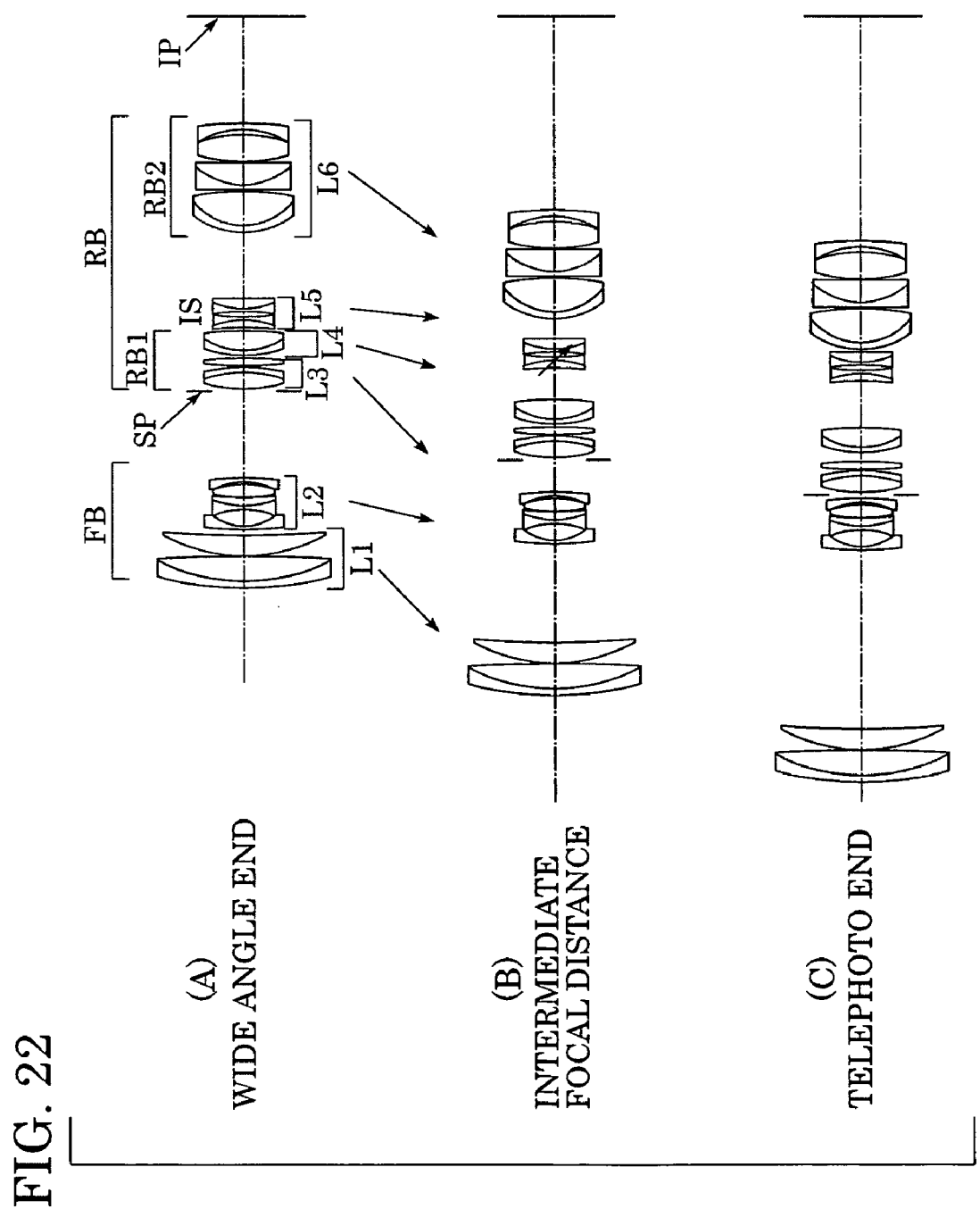
FIG. 22 shows schematic drawings of a zoom lens system according to a fourth embodiment of the present invention.
Figure 23:
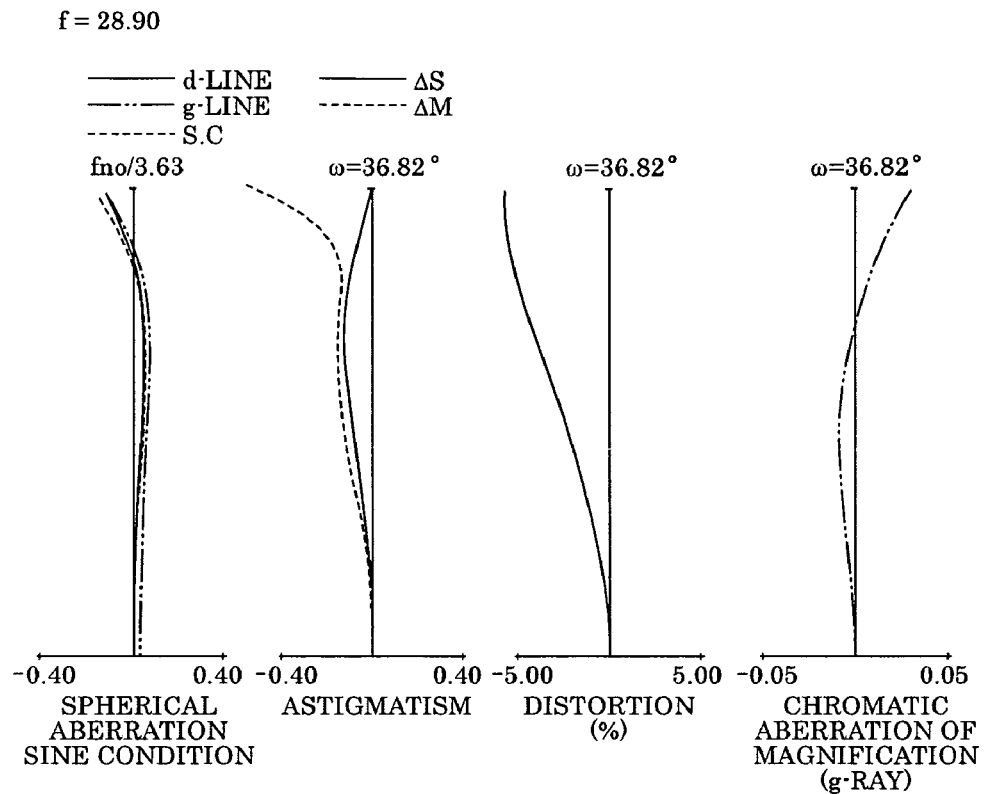
FIG. 23 is a longitudinal aberration diagram of the zoom lens according to the fourth embodiment at the wide angle end under base conditions.
Figure 24:
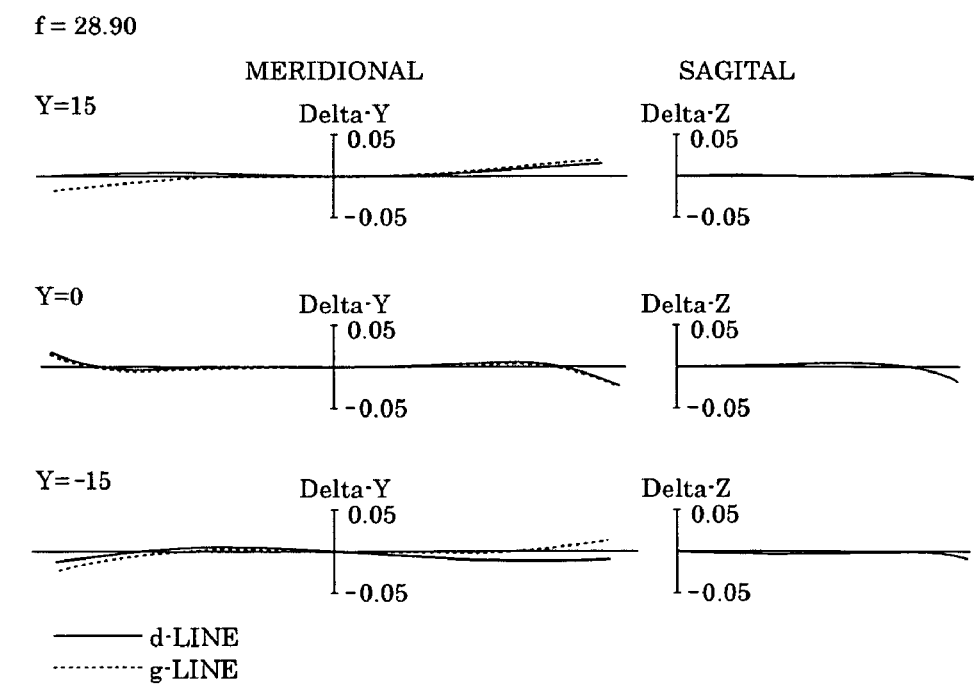
FIG. 24 is a lateral aberration diagram of the zoom lens according to the fourth embodiment at the wide angle end when the image position of an object at an infinite distance is displaced by a field angle of 0.3°.

FIG. 22 shows schematic drawings of a zoom lens according to a fourth embodiment of the present invention; FIG. 23 is a longitudinal aberration diagram of the zoom lens according to the fourth embodiment at the wide angle end under base conditions; and FIG. 24 is a lateral aberration diagram of the zoom lens according to the fourth embodiment at the wide angle end under vibration-proof conditions (the image position of the object at an infinite distance is displaced by an angle equivalent to a field angle of 0.3°).

Figure 25:
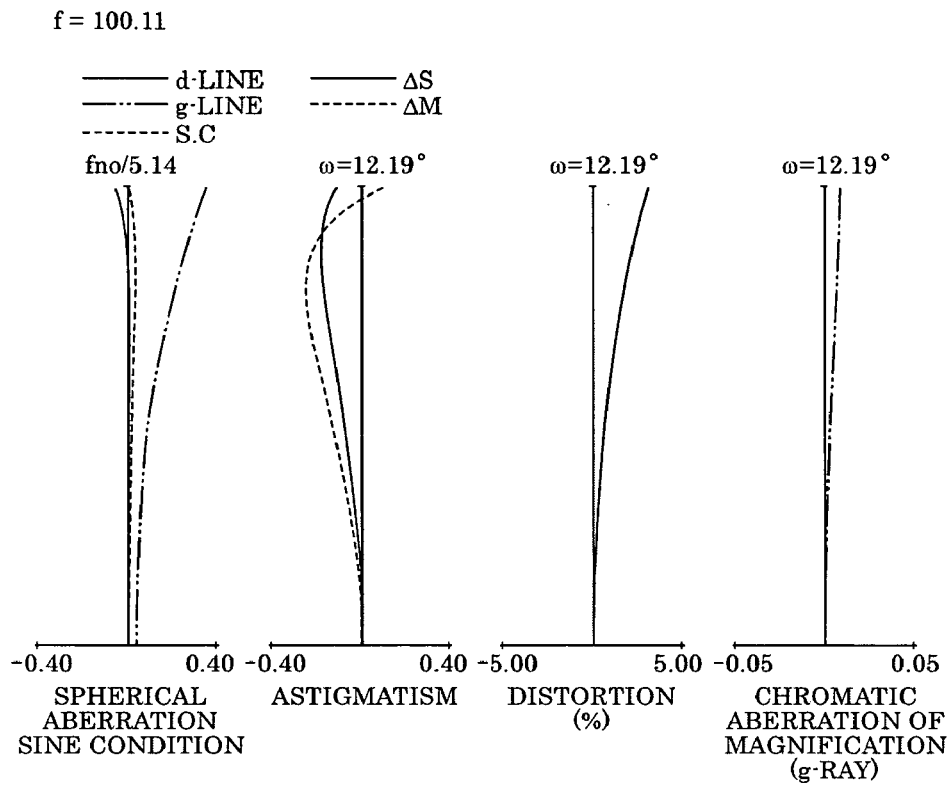
FIG. 25 is a longitudinal aberration diagram of the zoom lens according to the fourth embodiment at an intermediate zoom position under base conditions.
Figure 26:
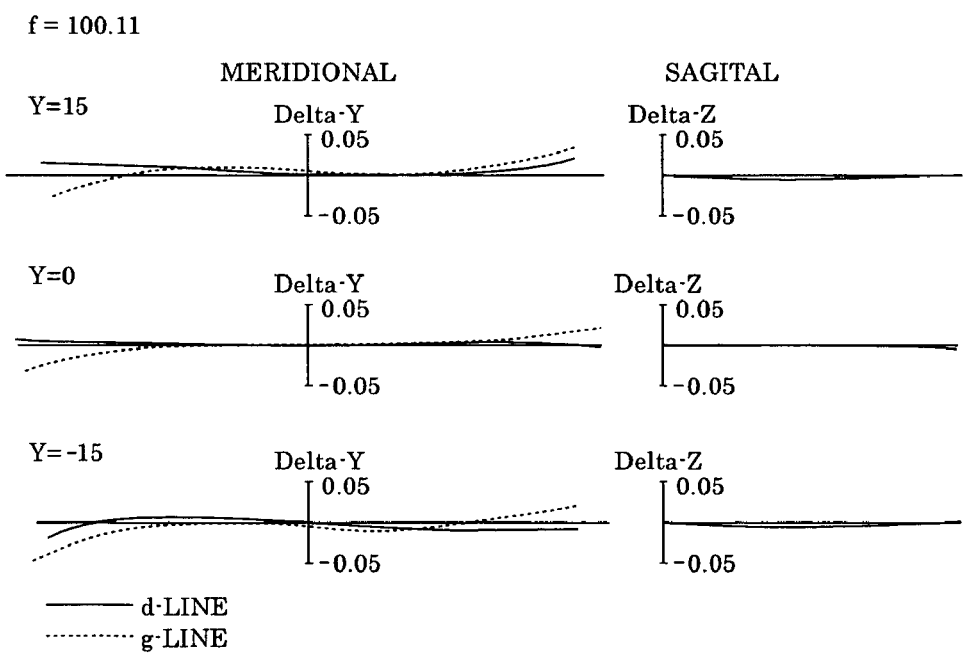
FIG. 26 is a lateral aberration diagram of the zoom lens according to the fourth embodiment at an intermediate zoom position when the image position of an object at an infinite distance is displaced by a field angle of 0.3°.

FIG. 25 is a longitudinal aberration diagram of the zoom lens according to the fourth embodiment at an intermediate zoom position under the base conditions; FIG. 26 is a lateral aberration diagram of the zoom lens according to the fourth embodiment at an intermediate zoom position under the vibration-proof conditions (the image position of the object at an infinite distance is displaced by an angle equivalent to a field angle of 0.3°).

Figure 27:
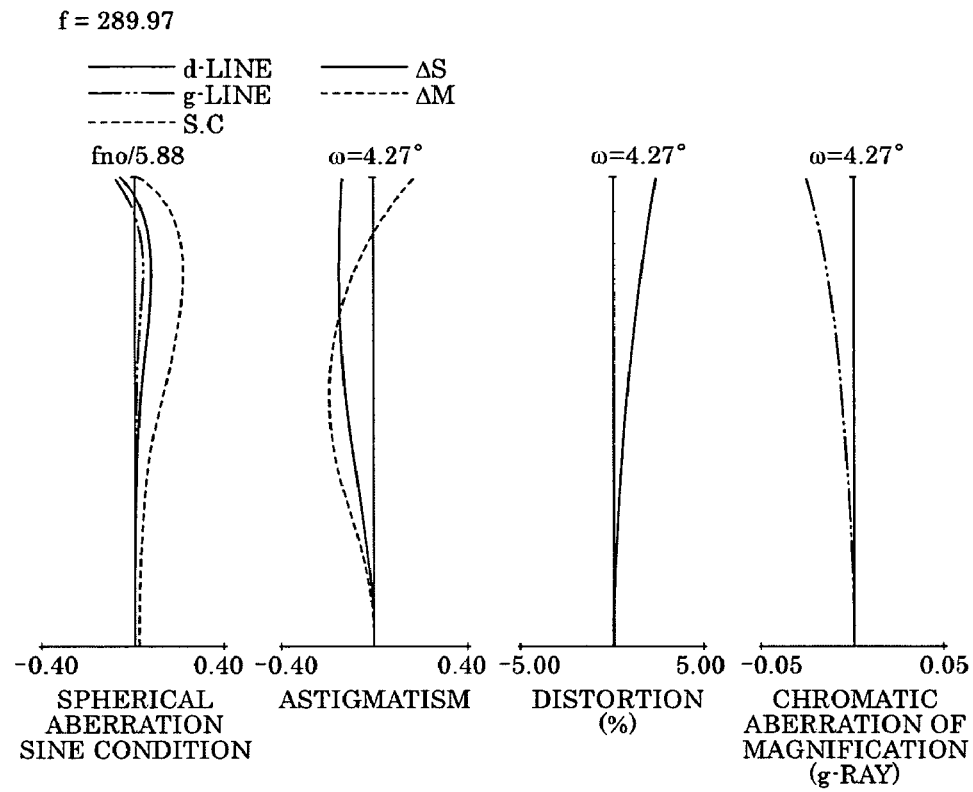
FIG. 27 is a longitudinal aberration diagram of the zoom lens according to the fourth embodiment at the telephoto end under base conditions.
Figure 28:
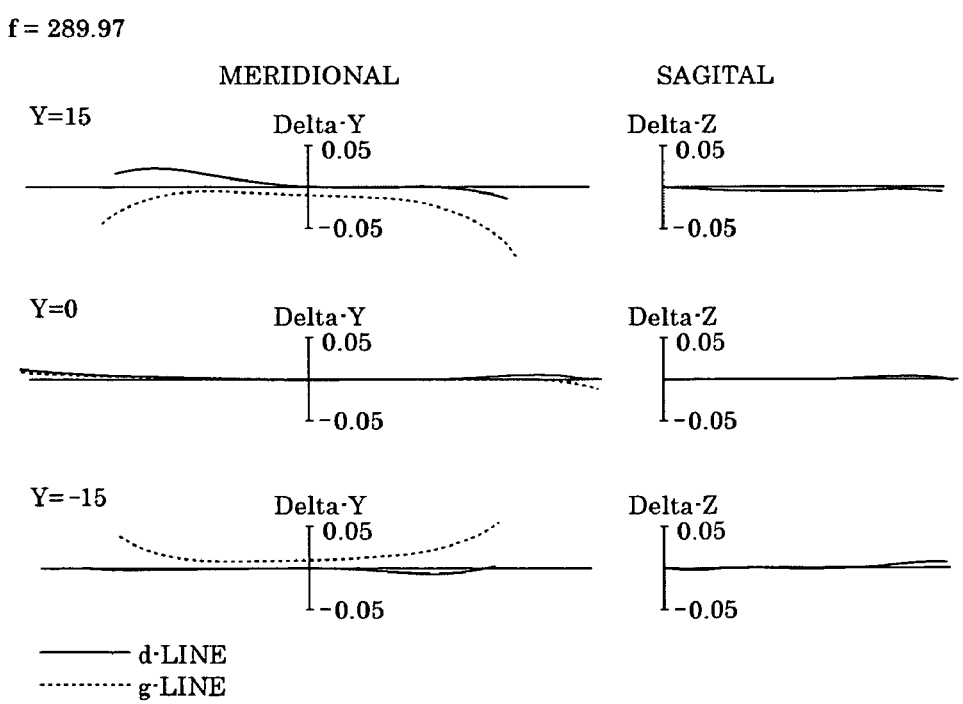
FIG. 28 is a lateral aberration diagram of the zoom lens according to the fourth embodiment at the telephoto end when the image position of an object at an infinite distance is displaced by a field angle of 0.3°.

FIG. 27 is a longitudinal aberration diagram of the zoom lens according to the fourth embodiment at the telephoto end under the base conditions; FIG. 28 is a lateral aberration diagram of the zoom lens according to the fourth embodiment at the telephoto end under the vibration-proof conditions (the image position of the object at an infinite distance is displaced by an angle equivalent to a field angle of 0.3°).

FIG. 29 shows schematic drawings of a zoom lens according to a fifth embodiment of the present invention; FIG. 30 is a longitudinal aberration diagram of the zoom lens according to the fifth embodiment at the wide angle end under base conditions; and FIG. 31 is a lateral aberration diagram of the zoom lens according to the fifth embodiment at the wide angle end under vibration-proof conditions (the image position of the object at an infinite distance is displaced by an angle equivalent to a field angle of 0.3°).

Figure 32:
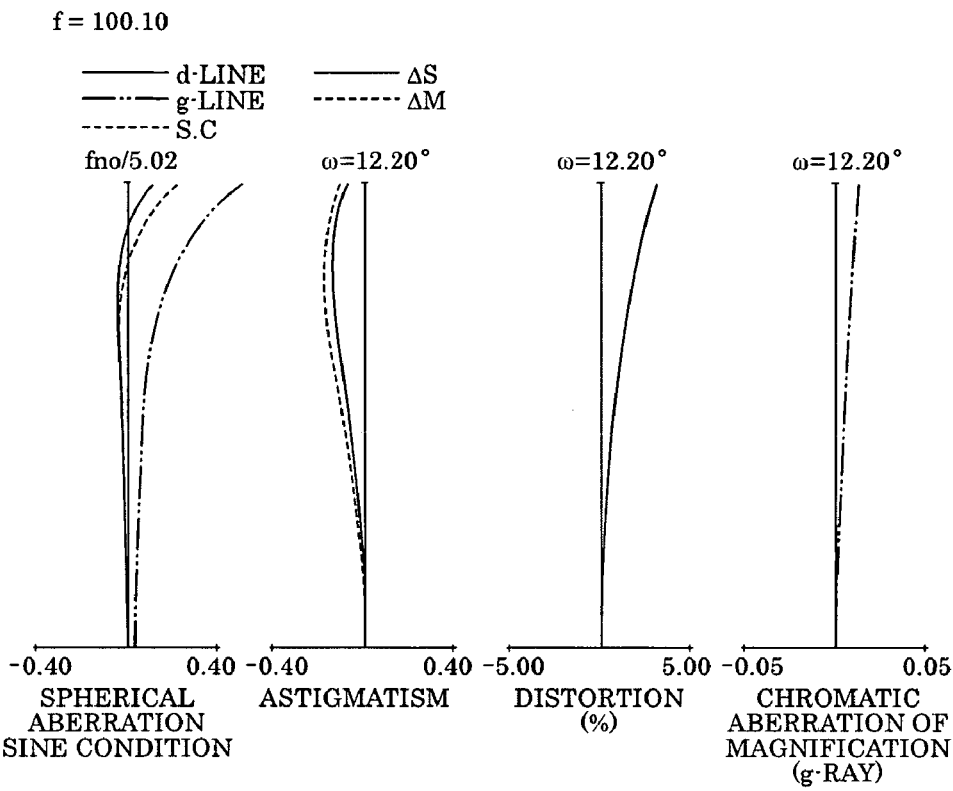
FIG. 32 is a longitudinal aberration diagram of the zoom lens according to the fifth embodiment at an intermediate zoom position under base conditions.
Figure 33:
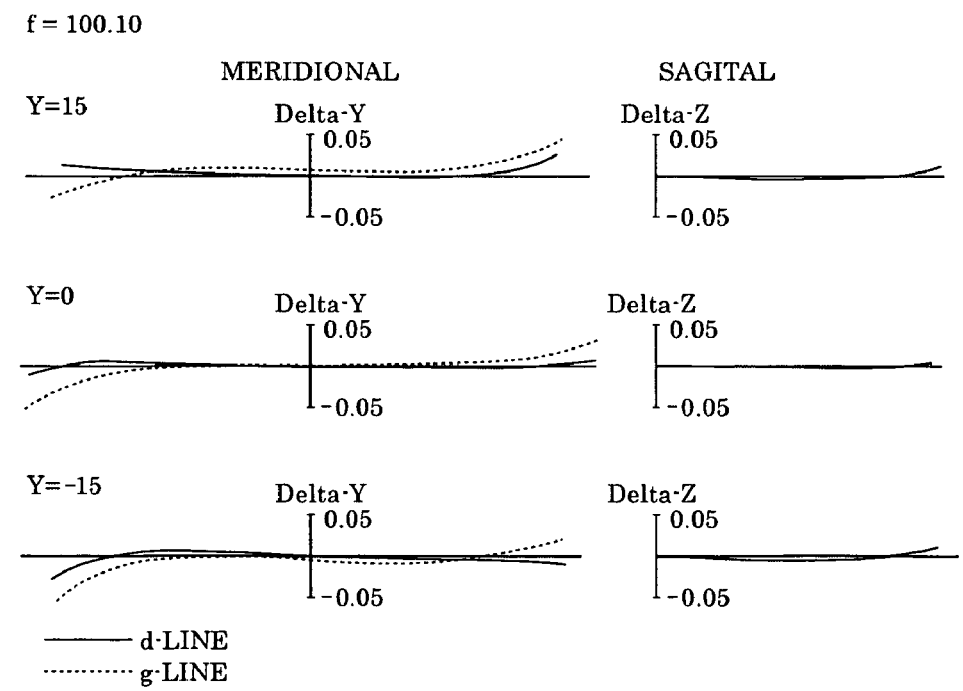
FIG. 33 is a lateral aberration diagram of the zoom lens according to the fifth embodiment at an intermediate zoom position when the image position of an object at an infinite distance is displaced by a field angle of 0.3°.

FIG. 32 is a longitudinal aberration diagram of the zoom lens according to the fifth embodiment at an intermediate zoom position under the base conditions; FIG. 33 is a lateral aberration diagram of the zoom lens according to the fifth embodiment at an intermediate zoom position under the vibration-proof conditions (the image position of the object at an infinite distance is displaced by an angle equivalent to a field angle of 0.3°).

Figure 34:
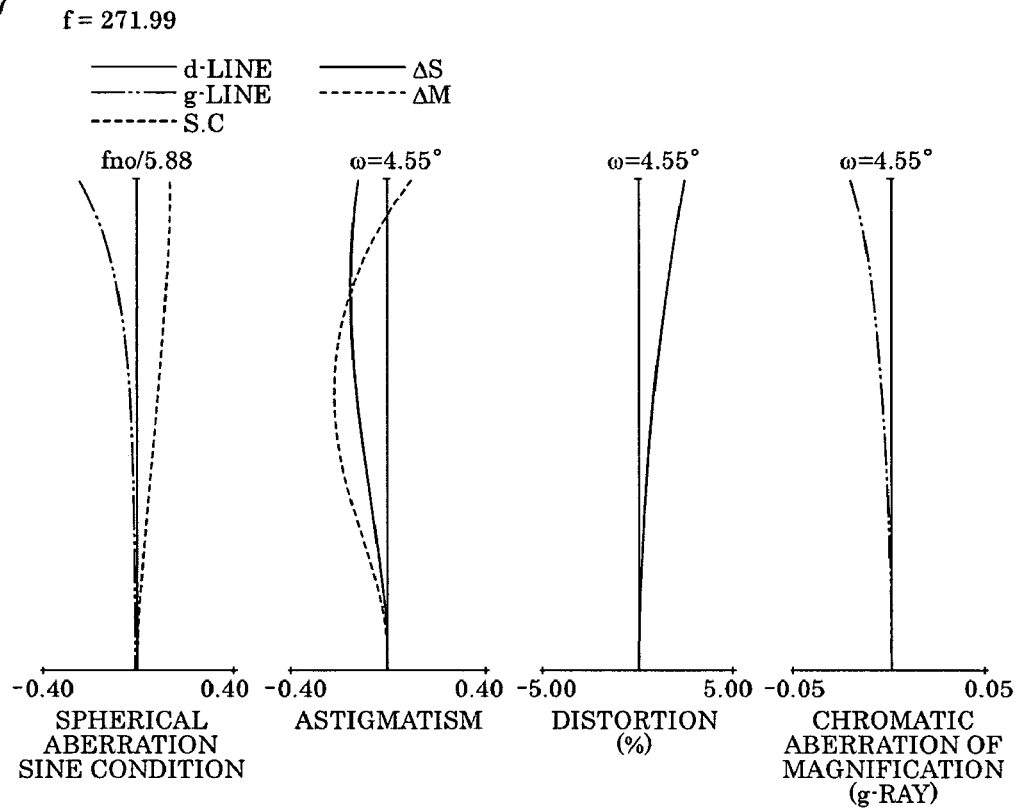
FIG. 34 is a longitudinal aberration diagram of the zoom lens according to the fifth embodiment at the telephoto end under base conditions.
Figure 35:
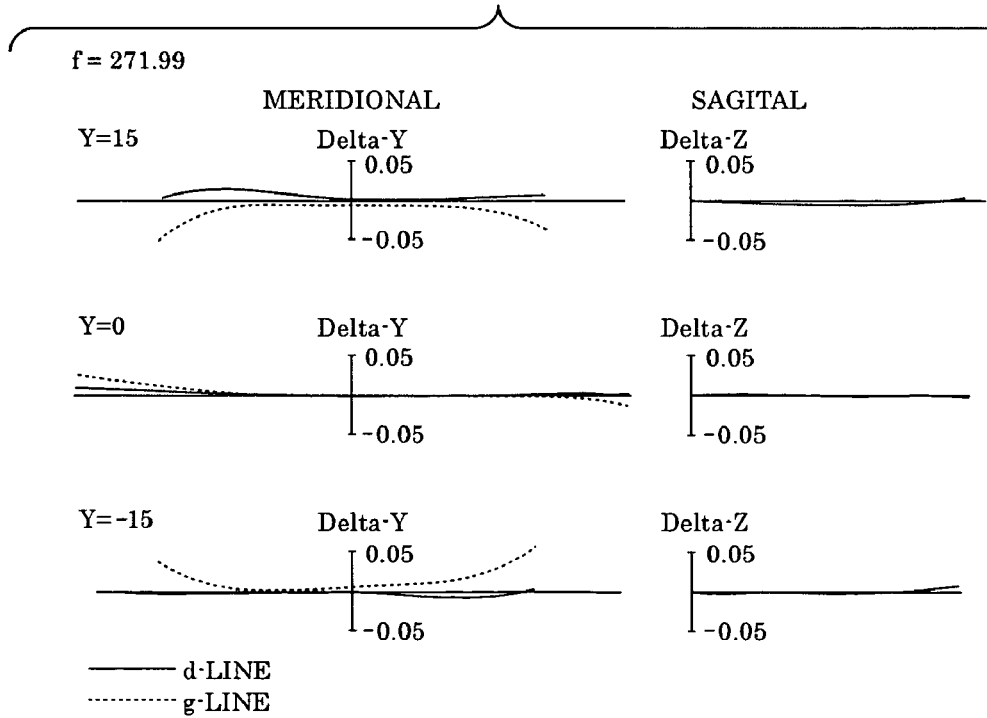
FIG. 35 is a lateral aberration diagram of the zoom lens according to the fifth embodiment at the telephoto end when the image position of an object at an infinite distance is displaced by a field angle of 0.3°.

FIG. 34 is a longitudinal aberration diagram of the zoom lens according to the fifth embodiment at the telephoto end under the base conditions; FIG. 35 is a lateral aberration diagram of the zoom lens according to the fifth embodiment at the telephoto end under the vibration-proof conditions (the image position of the object at an infinite distance is displaced by an angle equivalent to a field angle of 0.3°).

Figure 36:
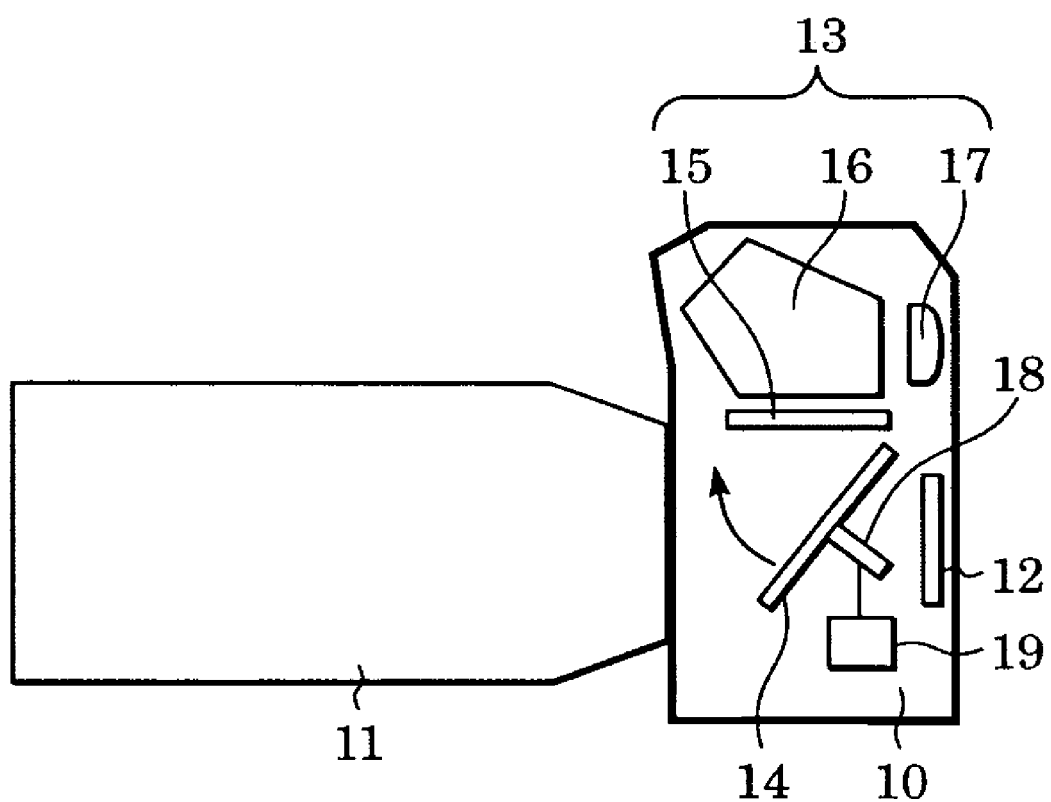
FIG. 36 is a schematic view of an essential part of an imaging apparatus according to the present invention.

FIG. 36 is a schematic view of an essential part of a single lens reflex camera (image pickup apparatus) having the zoom lens according to the present invention.

In FIGS. 1, 8, 15, 22, and 29, symbol (A) denotes a state at the wide angle end; symbol (B) denotes a state at an intermediate zoom position; and symbol (C) denotes a state at the telephoto end. Also, the left is an object side (front) and the right is an image side (rear).

The zoom lens according to the embodiments is an imaging lens system used in the image pickup apparatus. Character FB represents a front lens group including a first lens unit L1 with positive refractive power (optical power equals the inverse number of the focal distance) and a second lens unit L2 with negative refractive power.

Character RB represents a rear lens group including a lens component RB1 with positive refractive power, a lens unit IS, and a lens component RB2 with positive refractive power. The lens component RB1 includes a third lens unit L3 with positive refractive power and a fourth lens unit L4 with positive refractive power. The lens unit IS is composed of a fifth lens unit L5 with negative refractive power. The lens component RB2 is composed of a sixth lens unit L6 with positive refractive power. The lens unit IS is an image stabilizing lens unit capable of moving so as to have a component in a direction perpendicular to an optical axis in order to suppress deterioration of an image (image blurring). In addition, the lens component RB2 may also be composed of a plurality of lens units like the lens component RB1.

An aperture diaphragm (an aperture stop) SP is located adjacent to the object of the third lens unit L3. An image surface IP corresponds to an image-pickup surface of a solid image-pickup element (photo-electric transducer), such as a CCD (charge coupled device) sensor and a CMOS (complementary metal-oxide semiconductor) sensor, when being used in an imaging system of video cameras and digital still cameras, and to a film surface when being used in silver-film cameras.

In the aberration diagrams, reference characters d and g denote a d ray and a g ray; characters $\Delta M$ and $\Delta S$ denote a meridional image surface and a sagital image surface, respectively. The chromatic aberration of magnification is represented by the g ray. Character Y denotes an image height.

In the embodiments below, the wide angle end and the telephoto end mean both ends of a range where a lens unit for variable magnification (second to sixth lens unit according to the embodiments) is movable along an optical axis in a mechanism.

The zooming lens according to the embodiments includes the front lens group FB increasing magnification during zooming and the rear lens group RB with positive refractive power as a whole, which are arranged from an object toward the images in that order. The rear lens group RB includes the lens unit IS with negative refractive power, which is moved so as to have a component in a direction perpendicular to an optical axis and thereby displacing picked-up images to the optical axis, and the lens component RB2 with positive refractive power disposed adjacent of the image further than the lens unit IS. During the zooming, the space between the lens unit IS and the lens component RB2 changes.

Specifically, according to the first embodiment of FIG. 1, during zooming from the wide angle end to the telephoto end, the following occurs: the first lens unit L1 moves toward the object side; the second lens unit L2 moves while increasing the space with respect to the first lens unit L1; the third lens unit L3 moves toward the object side while decreasing the space with respect to the second lens unit L2; the fourth lens unit L4 moves toward the object side while decreasing the space with respect to the third lens unit L3; the fifth lens unit L5 moves toward the object side while increasing the space with respect to the fourth lens unit L4; the sixth lens unit L6 moves toward the object side while decreasing the space with respect to the fifth lens unit L5; and the diaphragm SP moves integrally with the third lens unit L3.

According to the second to the fifth embodiments shown in FIGS. 8, 15, 22, 29, during zooming from the wide angle end to the telephoto end, the following occurs: the first lens unit L1 moves toward the object side; the second lens unit L2 moves while increasing the space with respect to the first lens unit L1; the third lens unit L3 moves toward the object side while decreasing the space with respect to the second lens unit L2; the fourth lens unit L4 moves toward the object side while increasing the space with respect to the third lens unit L3; the fifth lens unit L5 moves toward the object side while increasing the space with respect to the fourth lens unit L4; the sixth lens unit L6 moves toward the object side while decreasing the space with respect to the fifth lens unit L5; and the diaphragm SP moves integrally with the third lens unit L3.

According to the embodiments, by moving the lens unit IS (the fifth lens unit L5) so as to have a component in a direction perpendicular to an optical axis, images formed by the zoom lens are displaced in the direction perpendicular to the optical axis, thereby suppressing deterioration of object images due to hand movements, for example.

According to the embodiments, the zoom lens may be focused by moving the entire, a single, or a plurality of the lens units. In particular, if the second lens unit L2 is moved, excellent optical performance may be easily obtained.

The lens configuration of each lens unit will be described. The first lens unit L1 includes a cemented lens of a meniscus 11th lens with negative refractive power having a convex object-side surface bonded to a 12th lens with positive refractive power, and a meniscus 13th lens with positive refractive power having a convex object-side surface, which are arranged in that order from an object side to the image side.

The second lens unit L2 includes a meniscus 21st lens with negative refractive power having a convex object-side surface, a cemented lens of a 22nd lens with negative refractive power having a concave object-side surface bonded to a 23rd lens with positive refractive power, a 24th lens with positive refractive power having convex object-side and image-side surfaces, and a meniscus 25th lens with negative refractive power having a convex image-side surface.

The third lens unit L3 includes one or three lenses.

The fourth lens unit L4 includes two or four lenses including a cemented lens.

The fifth lens unit L5 (the lens unit IS) includes three or four lenses including a lens with positive refractive power and a lens with negative refractive power.

The sixth lens unit L6 includes six lenses including a cemented lens.

Then, features of the embodiments will be described in addition to the features described above.

In the embodiments, the following condition is satisfied:

$$0.05 < |fis|/ft < 0.25 \quad (1),$$

wherein fis denotes the focal distance of the lens unit IS (the fifth lens unit L5), and ft denotes the focal distance of the entire system at the telephoto end.

For a zoom lens with a large zoom ratio having a vibration-isolation function, it is necessary to simultaneously secure basic conditions (a state in which the vibration-isolation function is stopped) over the entire zooming range, and optical performances during vibration-isolation.

Then, in the zoom lens according to the present invention, during zooming from the wide angle end to the telephoto end, the space in between the image stabilizing lens unit IS and the lens component RB2 with positive refractive power (the sixth lens unit L6), which is disposed closer to images than the lens unit IS, is changed, thereby correcting changes in image-surface distortion produced during zooming from the wide angle end to the telephoto end and eccentric aberration during vibration isolation.

As described above, the optical system having a vibration-isolation function needs to maintain high sensibility for readily displacing images of the image stabilizing lens unit and also to hold optical performances during vibration-isolation. The conditional expression (1) is a condition for achieving the above-mentioned objective. If the absolute value of the focal distance of the lens unit IS for correcting the image displacement is increased to exceed the upper limit of the conditional expression (1), it is difficult to maintain image-displacement sensibility of the image stabilizing lens unit. If the absolute value of the focal distance of the lens unit for correcting the image displacement is decreased so as to exceed the lower limit, it is difficult to correct eccentric coma aberration produced especially during the vibration isolating.

The numerical range of the conditional expression (1) may be provided as follows:

$$0.1 < |fis|/ft < 0.2 \quad (1a).$$

The rear lens group RB includes the lens component RB1 with positive refractive power disposed on the object side of the lens unit IS. In the rear lens group RB, during zooming from the wide angle end to the telephoto end, the space in between the lens component RB1 and the lens unit IS is increased, the space in between the lens unit IS and the lens component RB2 is decreased, and the following condition is satisfied:

$$0.2 < fRB2/ft < 0.5 \quad (2),$$

wherein fRB2 denotes the focal distance of the lens component RB2.

According to the embodiments, during zooming from the wide angle end to the telephoto end, increasing the space between the lens component RB1 and the vibration-isolating lens unit IS facilitates decreasing the lens diameter of the vibration-isolating lens unit IS. Also, during zooming from the wide angle end to the telephoto end, by decreasing the space between the vibration-isolating lens unit IS and the lens component RB2, the variable power of the entire optical system is assisted while vibration-proof sensitivity is readily maintained. Then, by satisfying the conditional expression (2), above-mentioned effects can be easily obtained.

The conditional expression (2) is a condition for appropriately establishing the focal distance fRB2 of the lens component RB2. If the focal distance fRB2 is within the upper limit of the conditional expression (2), the zoom ratio of the entire optical system can be easily obtained and the vibration-proof sensitivity can be highly and readily maintained at the telephoto end, so that the back focus is obtained at the wide angle end. If the focal distance fRB2 is within the lower limit, the negative distortion aberration at the wide angle end and the eccentric coma aberration during vibration isolation at the telephoto end can be easily corrected.

The numerical range of the conditional expression (2) may further be provided as follows:

$$0.22 < fRB2/ft < 0.4 \quad (2a).$$

Of the rear lens group RB, the lens component RB1 is arranged closest to an object, and has one or more lens units (the third lens unit L3 and the fourth lens unit L4 according to the first to the fifth embodiments), satisfying the following condition:

$$0.05 < fRB1t/ft < 0.2 \quad (3),$$

wherein fRB1t denotes the focal distance of the lens component RB1 at the telephoto end.

According to the embodiments, among the rear lens group RB, by arranging the lens component RB1 with positive refractive power closest to an object, a luminous flux emitted from the front lens group FB is efficiently converged by the lens component RB1. The outer diameter of the vibration-isolating lens unit IS is thereby readily reduced. Satisfying the conditional expression (3) enables achieving the above-mentioned effects and excellent optical performance.

The conditional expression (3) is a condition for appropriately establishing the focal distance of the lens component RB1. If the focal distance fRB1t is within the upper limit of the conditional expression (3), the zoom ratio of the entire optical system can be easily obtained and the vibration-proof sensitivity can be highly and readily maintained at the telephoto end. If the focal distance fRB1t is within the lower limit, the spherical aberration at the telephoto end and the eccentric coma aberration during vibration isolation can be easily corrected.

The numerical range of the conditional expression (3) may further be provided as follows:

$$0.07 < fRB1t/ft < 0.15 \quad (3a).$$

The lens component RB1 has at least two lens units, and during zooming from the wide angle end to the telephoto end, the space in between the two lens units is changed. With such a configuration, changes in image-surface distortion due to zooming are corrected.

The front lens group FB includes the first lens unit L1 with positive refractive power and the second lens unit L2 with negative refractive power which are arranged in that order from the object side to the image side. During zooming from the wide angle end to the telephoto end, the space in between the first lens unit L1 and the second lens unit L2 is increased while the space in between the second lens unit L2 and the rear lens group RB is reduced, satisfying the following conditions:

$$0.2 < f1/ft < 0.6 \quad (4)$$

and $$0.03 < |f2|/ft < 0.1 \quad (5),$$

wherein fn denotes the focal distance of the nth lens unit.

By such a configuration, the power arrangement is a retrofocus type at the wide angle end and a telephoto type at the telephoto end. Thereby, the amount of light is easily maintained in the vicinity of the wide angle end and bright F number is readily secured at the telephoto end. Satisfying the conditional expressions (4) and (5) enables the above-mentioned effects and excellent optical performance to be achieved.

The conditional expression (4) relates to the focal distance of the first lens unit L1 with positive refractive power. If the focal distance f1 is within the upper limit of the conditional expression (4), bright F number is readily secured at the telephoto end and the entire length of the optical system is easily reduced, and if the focal distance f1 is within the lower limit of the conditional expression (4), the spherical aberration at the telephoto end is easily corrected and the front lens diameter is decreased.

The conditional expression (5) relates to the focal distance of the second lens unit L2 with positive refractive power. If the focal distance f2 is within the upper limit of the conditional expression (5), the power arrangement is a retrofocus type at the wide angle end, so that the amount of light is easily maintained in the vicinity of the wide angle end and the image-surface distortion is readily corrected. Furthermore, since the variable power ratio in the front lens group FB can be increased, a zoom lens with a high zoom ratio is easily constructed. If the focal distance f1 is within the lower limit of the conditional expression (5), the negative distortion aberration at the wide angle end can be easily corrected and changes in the chromatic aberration of magnification due to zooming can be readily suppressed.

The numerical ranges of the conditional expressions (4) and (5) may further be provided as follows:

$$0.3 < f1/ft < 0.5 \quad (4a)$$

and $$0.045 < |f2|/ft < 0.08 \quad (5a).$$

The lens unit IS includes a positive lens element and a cemented lens of a negative lens element bonded to a positive lens element, and also has at least one aspheric surface in which positive refractive power increases towards the periphery of the lens from the lens center.

By constructing the lens unit (vibration-isolating lens unit) IS as described above, while high sensibility for vibration-isolating is secured, eccentric chromatic aberration of magnification produced during vibration-isolation is excellently corrected. In particular, when at least one aspheric surface in that positive refractive power increases toward the periphery of the lens from the lens center is arranged, eccentric coma aberration produced during vibration-isolation is readily corrected. At this time, the aspheric surface may be any one of a polished aspheric surface, a glass-mold aspheric surface, an aspheric surface made of a spherical lens having a resin formed on the surface, and a plastic-mold aspheric surface.

An embodiment of a single lens reflex camera system using the zoom lens according to the present invention will be described with reference to FIG. 36. Referring to FIG. 36, reference numeral 10 denotes a single-lens reflex camera body; numeral 11 denotes an interchangeable lens having the zoom lens according to the present invention; numeral 12 denotes a photosensitive member for recording an object image obtained through the interchangeable lens 11, such as a film and a solid imaging element (CCD or CMOS); numeral 13 denotes a finder optical system for observing the object image from the interchangeable lens 11; and numeral 14 denotes a quick return mirror for switching the object image from the interchangeable lens 11 between the photosensitive member 12 and the finder optical system 13 for transmission. When the object image is observed through the finder, the object image focused on a focusing plate 15 via the quick return mirror 14 is magnified with an eyepiece optical system 17 after the object image is erected to be an upright image with a penta prism 16. During imaging, the quick return mirror 14 is rotated in the direction of the arrow so that the object image is focused on the photosensitive member 12. Reference numeral 18 denotes a sub mirror and numeral 19 represents a focal point detector.

By incorporating the zoom lens according to the present invention into an optical instrument such as an interchangeable lens for single-lens reflex cameras in such a manner, an optical instrument with high optical performance can be achieved.

In addition, the present invention may also be applied to a SLR (single lens reflex) camera without a quick return mirror in a similar manner.

Numerical examples 1 to 5 respectively corresponding to the first to the fifth embodiments will be shown below. In the numerical examples, character i denotes the order of a surface from the object side; character Ri denotes the curvature radius of the surface i; character Di denotes the member thickness or the air space between the surface i and the surface i+1; and characters Ni and vi denote the refractive index and Abbe constant with reference to a d ray, respectively.

The aspheric surface shape is expressed in [Numerical Formula 1] when the displacement in the optical axial direction at a position with the height h is represented by X with reference the surface apex.

$$X = \frac{\left(\frac{1}{R}\right)H^2}{1+\sqrt{1-\left(\frac{H}{R}\right)^2}} + AH^2 + BH^4 + CH^6 + DH^8 + EH^{10} + FH^{12}$$

[Numerical Formula 1]

wherein R denotes the paraxial curvature radius, k denotes the conic constant, and A, B, C, D, E, and F denote the aspheric surface factor.

Also [e$^{-X}$] means [×10$^{-X}$]. Character f denotes the focal distance, character Fno denotes the F number, and character ω denotes the half field angle. The relationship between the conditional expressions mentioned above and numerals of the numerical examples are shown in Table 1.

First Numerical Example
f = 28.84~291.05 Fno = 3.63~5.88 2ω = 73.8~8.5

| | | | |
|---|---|---|---|
| R1 = 142.559 | D1 = 2.50 | N1 = 1.834000 | v1 = 37.2 |
| R2 = 72.152 | D2 = 9.68 | N2 = 1.496999 | v2 = 81.5 |
| R3 = −705.047 | D3 = 0.15 | | |
| R4 = 65.851 | D4 = 7.77 | N3 = 1.496999 | v3 = 81.5 |
| R5 = 365.544 | D5 = VARIABLE | | |
| *R6 = 253.901 | D6 = 0.05 | N4 = 1.524210 | v4 = 51.4 |
| R7 = 120.623 | D7 = 1.45 | N5 = 1.882997 | v5 = 40.8 |
| R8 = 19.881 | D8 = 6.54 | | |
| R9 = −34.846 | D9 = 1.20 | N6 = 1.882997 | v6 = 40.8 |
| R10 = 28.652 | D10 = 3.35 | N7 = 1.761821 | v7 = 26.5 |
| R11 = 124.445 | D11 = 0.15 | | |
| R12 = 55.840 | D12 = 5.46 | N8 = 1.761821 | v8 = 26.5 |
| R13 = −32.118 | D13 = 1.21 | | |
| R14 = −22.744 | D14 = 1.30 | N9 = 1.772499 | v9 = 49.6 |
| R15 = −48.641 | D15 = VARIABLE | | |
| R16 = | D16 = 1.00 | | |
| DIAPHRAGM | | | |
| R17 = 64.693 | D17 = 3.00 | N10 = 1.518229 | v10 = 58.9 |
| R18 = 127.041 | D18 = VARIABLE | | |
| R19 = 39.338 | D19 = 7.25 | N11 = 1.487490 | v11 = 70.2 |
| R20 = −45.681 | D20 = 1.80 | N12 = 1.846660 | v12 = 23.9 |
| R21 = −68.799 | D21 = 0.15 | | |
| R22 = 45.193 | D22 = 1.80 | N13 = 1.805181 | v13 = 25.4 |
| R23 = 25.292 | D23 = 0.69 | | |
| R24 = 28.967 | D24 = 7.47 | N14 = 1.583126 | v14 = 59.4 |
| *R25 = −92.285 | D25 = VARIABLE | | |
| R26 = −82.591 | D26 = 1.35 | N15 = 1.834807 | v15 = 42.7 |
| R27 = 63.629 | D27 = 2.27 | | |
| R28 = −51.219 | D28 = 1.20 | N16 = 1.618000 | v16 = 63.3 |
| R29 = 35.777 | D29 = 5.91 | N17 = 1.688931 | v17 = 31.1 |
| *R30 = −59.345 | D30 = VARIABLE | | |
| R31 = 31.107 | D31 = 13.45 | N18 = 1.496999 | v18 = 81.5 |
| R32 = −46.537 | D32 = 3.00 | N19 = 1.772499 | v19 = 49.6 |
| R33 = −76.338 | D33 = 1.78 | | |
| R34 = −482.730 | D34 = 2.50 | N20 = 1.834807 | v20 = 42.7 |
| R35 = 27.556 | D35 = 11.45 | N21 = 1.517417 | v21 = 52.4 |
| R36 = −221.383 | D36 = 0.85 | | |
| R37 = 56.971 | D37 = 9.87 | N22 = 1.487490 | v22 = 70.2 |
| R38 = −54.521 | D38 = 2.91 | | |
| R39 = −27.305 | D39 = 3.00 | N23 = 1.804000 | v23 = 46.6 |
| R40 = −78.811 | | | |

| | FOCAL DISTANCE | | |
|---|---|---|---|
| VARIABLE SPACE | 28.84 | 100.11 | 291.05 |
| D5 | 2.10 | 40.86 | 70.52 |
| D15 | 32.87 | 12.67 | 1.16 |
| D18 | 4.46 | 1.13 | 0.58 |
| D25 | 1.50 | 9.94 | 17.73 |
| D30 | 21.96 | 5.59 | 0.80 |

ASPHERIC SURFACE FACTOR

| | |
|---|---|
| SIXTH SURFACE: | A = 0.00000e+00 B = 1.04424e−05 |
| | C = −6.73338e−09 D = −3.75695e−12 |
| | E = 1.09776e−13 F = 0.00000e+00 |
| 25TH SURFACE: | A = 0.00000e+00 B = 5.45893e−06 |
| | C = −1.25239e−09 D = 2.41662e−12 |
| | E = 0.00000e+00 F = 0.00000e+00 |
| 30TH SURFACE: | A = 0.00000e+00 B = −1.17359e−06 |
| | C = −4.31603e−10 D = −9.54331e−13 |
| | E = 0.00000e+00 F = 0.00000e+00 |

Second Numerical Example
f = 28.90~289.98 Fno = 3.63~5.88 2ω = 73.6~8.5

| | | | |
|---|---|---|---|
| R1 = 159.265 | D1 = 3.00 | N1 = 1.749500 | v1 = 35.3 |
| R2 = 76.720 | D2 = 9.57 | N2 = 1.496999 | v2 = 81.5 |
| R3 = −435.193 | D3 = 0.15 | | |
| R4 = 67.620 | D4 = 6.76 | N3 = 1.496999 | v3 = 81.5 |
| R5 = 239.432 | D5 = VARIABLE | | |
| *R6 = 190.000 | D6 = 1.50 | N4 = 1.882997 | v4 = 40.8 |
| R7 = 19.738 | D7 = 6.57 | | |
| R8 = −32.600 | D8 = 1.30 | N5 = 1.882997 | v5 = 40.8 |
| R9 = 45.657 | D9 = 2.54 | N6 = 1.761821 | v6 = 26.5 |
| R10 = 261.571 | D10 = 0.15 | | |
| R11 = 60.315 | D11 = 6.23 | N7 = 1.761821 | v7 = 26.5 |
| R12 = −27.449 | D12 = 0.87 | | |
| R13 = −22.017 | D13 = 1.30 | N8 = 1.772499 | v8 = 49.6 |
| R14 = −62.550 | D14 = VARIABLE | | |
| R15 = | D15 = VARIABLE | | |
| DIAPHRAGM | | | |
| R16 = 65.963 | D16 = 7.21 | N9 = 1.518229 | v9 = 58.9 |
| R17 = −31.199 | D17 = 1.50 | N10 = 1.805181 | v10 = 25.4 |
| R18 = −45.821 | D18 = 0.15 | | |

-continued

Second Numerical Example
f = 28.90~289.98 Fno = 3.63~5.88 2ω = 73.6~8.5

| | | | |
|---|---|---|---|
| R19 = 88.722 | D19 = 2.60 | N11 = 1.487490 | ν11 = 70.2 |
| R20 = 208.733 | D20 = VARIABLE | | |
| R21 = 39.240 | D21 = 1.50 | N12 = 1.805181 | ν12 = 25.4 |
| R22 = 22.169 | D22 = 7.59 | N13 = 1.583126 | ν13 = 59.4 |
| *R23 = −237.600 | D23 = VARIABLE | | |
| R24 = −253.619 | D24 = 1.40 | N14 = 1.834807 | ν14 = 42.7 |
| R25 = 54.423 | D25 = 2.20 | | |
| R26 = −54.107 | D26 = 1.20 | N15 = 1.651597 | ν15 = 58.5 |
| R27 = 28.149 | D27 = 4.61 | N16 = 1.717362 | ν16 = 29.5 |
| *R28 = −131.720 | D28 = VARIABLE | | |
| R29 = 32.483 | D29 = 2.50 | N17 = 1.712995 | ν17 = 53.9 |
| R30 = 23.761 | D30 = 12.97 | N18 = 1.496999 | ν18 = 81.5 |
| R31 = −68.312 | D31 = 0.15 | | |
| R32 = 334.342 | D32 = 1.70 | N19 = 1.882997 | ν19 = 40.8 |
| R33 = 25.699 | D33 = 8.50 | N20 = 1.582673 | ν20 = 46.4 |
| R34 = −1730.404 | D34 = 0.44 | | |
| R35 = 63.672 | D35 = 9.96 | N21 = 1.518229 | ν21 = 58.9 |
| R36 = −51.735 | D36 = 2.14 | | |
| R37 = −31.511 | D37 = 2.00 | N22 = 1.834807 | ν22 = 42.7 |
| R38 = −105.302 | | | |

| | FOCAL DISTANCE | | |
|---|---|---|---|
| VARIABLE SPACE | 28.90 | 100.14 | 289.98 |
| D5 | 2.70 | 40.52 | 73.27 |
| D14 | 26.96 | 9.62 | 0.99 |
| D20 | 0.97 | 5.92 | 8.22 |
| D23 | 1.43 | 11.35 | 17.48 |
| D28 | 25.16 | 7.20 | 1.20 |

ASPHERIC SURFACE FACTOR

| | |
|---|---|
| SIXTH SURFACE: | A = 0.00000e+00  B = 5.13665e−06 |
| | C = 9.11083e−10  D = −1.23247e−11 |
| | E = 8.40231e−14  F = 0.00000e+00 |
| 23RD SURFACE: | A = 0.00000e+00  B = 3.09763e−06 |
| | C = −7.98703e−10  D = 1.37033e−12 |
| | E = 0.00000e+00  F = 0.00000e+00 |
| 28TH SURFACE: | A = 0.00000e+00  B = −3.14506e−07 |
| | C = 2.02186e−10  D = 0.00000e+00 |
| | E = 0.00000e+00  F = 0.00000e+00 |

Third Numerical Example
f = 28.90~289.99 Fno = 3.63~5.88 2ω = 73.6~8.5

| | | | |
|---|---|---|---|
| R1 = 137.462 | D1 = 3.00 | N1 = 1.800999 | ν1 = 35.0 |
| R2 = 73.201 | D2 = 9.48 | N2 = 1.496999 | ν2 = 81.5 |
| R3 = −681.020 | D3 = 0.15 | | |
| R4 = 67.668 | D4 = 7.18 | N3 = 1.496999 | ν3 = 81.5 |
| R5 = 308.033 | D5 = VARIABLE | | |
| *R6 = 203.499 | D6 = 1.50 | N4 = 1.882997 | ν4 = 40.8 |
| R7 = 19.296 | D7 = 6.49 | | |
| R8 = −30.695 | D8 = 1.30 | N5 = 1.882997 | ν5 = 40.8 |
| R9 = 38.266 | D9 = 2.75 | N6 = 1.761821 | ν6 = 26.5 |
| R10 = 286.148 | D10 = 0.15 | | |
| R11 = 62.401 | D11 = 6.09 | N7 = 1.761821 | ν7 = 26.5 |
| R12 = −28.255 | D12 = 1.05 | | |
| R13 = −21.385 | D13 = 1.30 | N8 = 1.772499 | ν8 = 49.6 |
| R14 = −51.185 | D14 = VARIABLE | | |
| R15 = DIAPHRAGM | D15 = 0.49 | | |
| R16 = 47.251 | D16 = 6.40 | N9 = 1.487490 | ν9 = 70.2 |
| R17 = −40.879 | D17 = 1.50 | N10 = 1.846660 | ν10 = 23.9 |
| R18 = −66.074 | D18 = 0.15 | | |
| R19 = 138.346 | D19 = 2.90 | N11 = 1.487490 | ν11 = 70.2 |
| R20 = −237.153 | D20 = VARIABLE | | |
| R21 = 41.862 | D21 = 1.50 | N12 = 1.850259 | ν12 = 32.3 |
| R22 = 21.261 | D22 = 8.29 | N13 = 1.583126 | ν13 = 59.4 |
| *R23 = −96.070 | D23 = VARIABLE | | |
| R24 = −124.712 | D24 = 1.40 | N14 = 1.882997 | ν14 = 40.8 |

-continued

Third Numerical Example
f = 28.90~289.99 Fno = 3.63~5.88 2ω = 73.6~8.5

| | | | |
|---|---|---|---|
| R25 = 62.893 | D25 = 2.19 | | |
| R26 = −49.709 | D26 = 1.20 | N15 = 1.618000 | ν15 = 63.3 |
| R27 = 30.406 | D27 = 5.90 | N16 = 1.688931 | ν16 = 31.1 |
| *R28 = −69.821 | D28 = VARIABLE | | |
| R29 = 33.981 | D29 = 2.50 | N17 = 1.696797 | ν17 = 55.5 |
| R30 = 24.959 | D30 = 13.48 | N18 = 1.496999 | ν18 = 81.5 |
| R31 = −88.157 | D31 = 2.65 | | |
| R32 = −416.635 | D32 = 1.70 | N19 = 1.882997 | ν19 = 40.8 |
| R33 = 33.238 | D33 = 0.30 | | |
| R34 = 34.471 | D34 = 9.32 | N20 = 1.517417 | ν20 = 52.4 |
| R35 = −75.065 | D35 = 0.15 | | |
| R36 = 51.693 | D36 = 9.33 | N21 = 1.487490 | ν21 = 70.2 |
| R37 = −96.994 | D37 = 2.91 | | |
| R38 = −36.578 | D38 = 2.00 | N22 = 1.834807 | ν22 = 42.7 |
| R39 = −163.208 | | | |

| | FOCAL DISTANCE | | |
|---|---|---|---|
| VARIABLE SPACE | 28.90 | 100.12 | 289.99 |
| D5 | 2.58 | 38.92 | 70.74 |
| D14 | 33.19 | 11.24 | 1.00 |
| D20 | 0.99 | 2.22 | 3.00 |
| D23 | 1.50 | 12.56 | 17.96 |
| D28 | 25.52 | 8.01 | 1.20 |

ASPHERIC SURFACE FACTOR

| | |
|---|---|
| SIXTH SURFACE: | A = 0.00000e+00  B = 6.88049e−06 |
| | C = −1.84425e−09  D = −8.67834e−12 |
| | E = 1.14702e−13  F = 0.00000e+00 |
| 23RD SURFACE: | A = 0.00000e+00  B = 4.31080e−06 |
| | C = −1.78020e−09  D = 1.63139e−12 |
| | E = 0.00000e+00  F = 0.00000e+00 |
| 28TH SURFACE: | A = 0.00000e+00  B = −5.36447e−07 |
| | C = 1.62743e−10  D = 1.07583e−12 |
| | E = 0.00000e+00  F = 0.00000e+00 |

Fourth Numerical Example
f = 28.90~289.97 Fno = 3.63~5.88 2ω = 73.6~8.5

| | | | |
|---|---|---|---|
| R1 = 130.111 | D1 = 3.00 | N1 = 1.850259 | ν1 = 32.3 |
| R2 = 77.186 | D2 = 9.10 | N2 = 1.496999 | ν2 = 81.5 |
| R3 = −670.064 | D3 = 0.15 | | |
| R4 = 68.821 | D4 = 6.77 | N3 = 1.496999 | ν3 = 81.5 |
| R5 = 261.721 | D5 = VARIABLE | | |
| *R6 = 203.499 | D6 = 1.50 | N4 = 1.882997 | ν4 = 40.8 |
| R7 = 19.819 | D7 = 6.53 | | |
| R8 = −31.972 | D8 = 1.30 | N5 = 1.882997 | ν5 = 40.8 |
| R9 = 33.953 | D9 = 2.95 | N6 = 1.761821 | ν6 = 26.5 |
| R10 = 230.193 | D10 = 0.15 | | |
| R11 = 60.864 | D11 = 6.05 | N7 = 1.761821 | ν7 = 26.5 |
| R12 = −29.131 | D12 = 1.10 | | |
| R13 = −21.579 | D13 = 1.30 | N8 = 1.772499 | ν8 = 49.6 |
| R14 = −51.616 | D14 = VARIABLE | | |
| R15 = DIAPHRAGM | D15 = 0.76 | | |
| R16 = 54.586 | D16 = 6.73 | N9 = 1.487490 | ν9 = 70.2 |
| R17 = −37.542 | D17 = 1.50 | N10 = 1.846660 | ν10 = 23.9 |
| R18 = −68.093 | D18 = 0.15 | | |
| R19 = 268.722 | D19 = 2.90 | N11 = 1.658441 | ν11 = 50.9 |
| R20 = −129.340 | D20 = VARIABLE | | |
| R21 = 44.864 | D21 = 1.50 | N12 = 1.850259 | ν12 = 32.3 |
| R22 = 22.671 | D22 = 8.28 | N13 = 1.583126 | ν13 = 59.4 |
| *R23 = −92.728 | D23 = VARIABLE | | |
| R24 = −74.979 | D24 = 2.69 | N14 = 1.800999 | ν14 = 35.0 |
| R25 = −31.090 | D25 = 1.25 | N15 = 1.651597 | ν15 = 58.5 |
| R26 = 59.225 | D26 = 1.72 | | |
| R27 = −96.899 | D27 = 1.30 | N16 = 1.603112 | ν16 = 60.6 |
| R28 = 26.445 | D28 = 4.01 | N17 = 1.654115 | ν17 = 39.7 |
| R29 = −759.579 | D29 = VARIABLE | | |

-continued

Fourth Numerical Example
f = 28.90~289.97 Fno = 3.63~5.88 2ω = 73.6~8.5

| | | | |
|---|---|---|---|
| R30 = 31.929 | D30 = 2.50 | N18 = 1.696797 | ν18 = 55.5 |
| R31 = 23.395 | D31 = 14.62 | N19 = 1.496999 | ν19 = 81.5 |
| R32 = −76.634 | D32 = 0.15 | | |
| R33 = −887.927 | D33 = 1.70 | N20 = 1.882997 | ν20 = 40.8 |
| R34 = 25.871 | D34 = 9.33 | N21 = 1.581439 | ν21 = 40.8 |
| R35 = −157.273 | D35 = 0.15 | | |
| R36 = 54.199 | D36 = 9.96 | N22 = 1.496999 | ν22 = 81.5 |
| R37 = −54.953 | D37 = 1.64 | | |
| R38 = −35.326 | D38 = 2.00 | N23 = 1.834807 | ν23 = 42.7 |
| R39 = −190.326 | | | |

| | FOCAL DISTANCE | | |
|---|---|---|---|
| VARIABLE SPACE | 28.90 | 100.11 | 289.97 |
| D5 | 2.62 | 39.77 | 71.33 |
| D14 | 33.69 | 11.61 | 1.00 |
| D20 | 0.99 | 2.97 | 4.26 |
| D23 | 1.47 | 11.95 | 18.61 |
| D29 | 26.33 | 7.96 | 1.20 |

| ASPHERIC SURFACE FACTOR | |
|---|---|
| SIXTH SURFACE: | A = 0.00000e+00  B = 6.60363e−06 |
| | C = −1.26435e−09  D = −5.33584e−12 |
| | E = 9.83657e−14  F = 0.00000e+00 |
| 23RD SURFACE: | A = 0.00000e+00  B = 3.08096e−06 |
| | C = −9.20455e−10  D = −2.65807e−13 |
| | E = 0.00000e+00  F = 0.00000e+00 |

Fifth Numerical Example
f = 28.90~271.99 Fno = 3.63~5.88 2ω = 73.6~9.1

| | | | |
|---|---|---|---|
| R1 = 135.083 | D1 = 2.60 | N1 = 1.850259 | ν1 = 32.3 |
| R2 = 78.332 | D2 = 9.52 | N2 = 1.496999 | ν2 = 81.5 |
| R3 = −423.621 | D3 = 0.15 | | |
| R4 = 63.456 | D4 = 6.62 | N3 = 1.496999 | ν3 = 81.5 |
| R5 = 181.696 | D5 = VARIABLE | | |
| *R6 = 203.499 | D6 = 1.50 | N4 = 1.882997 | ν4 = 40.8 |
| R7 = 19.628 | D7 = 6.51 | | |
| R8 = −31.819 | D8 = 1.30 | N5 = 1.882997 | ν5 = 40.8 |
| R9 = 29.075 | D9 = 3.21 | N6 = 1.761821 | ν6 = 26.5 |
| R10 = 154.950 | D10 = 0.15 | | |
| R11 = 59.227 | D11 = 5.81 | N7 = 1.761821 | ν7 = 26.5 |
| R12 = −30.172 | D12 = 1.18 | | |
| R13 = −21.148 | D13 = 1.30 | N8 = 1.772499 | ν8 = 49.6 |
| R14 = −42.364 | D14 = VARIABLE | | |
| R15 = DIAPHRAGM | D15 = 1.38 | | |
| R16 = 126.939 | D16 = 3.00 | N9 = 1.487490 | ν9 = 70.2 |
| R17 = −933.533 | D17 = 0.15 | | |
| R18 = 48.498 | D18 = 9.47 | N10 = 1.496999 | ν10 = 81.5 |
| R19 = −35.740 | D19 = 1.80 | N11 = 1.846660 | ν11 = 23.9 |

-continued

Fifth Numerical Example
f = 28.90~271.99 Fno = 3.63~5.88 2ω = 73.6~9.1

| | | | |
|---|---|---|---|
| R20 = −51.669 | D20 = VARIABLE | | |
| R21 = 41.758 | D21 = 1.50 | N12 = 1.850259 | ν12 = 32.3 |
| R22 = 22.976 | D22 = 7.15 | N13 = 1.583126 | ν13 = 59.4 |
| *R23 = −227.220 | D23 = VARIABLE | | |
| R24 = −138.882 | D24 = 1.30 | N14 = 1.834807 | ν14 = 42.7 |
| R25 = 59.168 | D25 = 2.44 | | |
| R26 = −45.755 | D26 = 1.20 | N15 = 1.618000 | ν15 = 63.3 |
| R27 = 38.534 | D27 = 5.60 | N16 = 1.688931 | ν16 = 31.1 |
| *R28 = −65.479 | D28 = VARIABLE | | |
| R29 = 33.981 | D29 = 2.50 | N17 = 1.696797 | ν17 = 55.5 |
| R30 = 25.756 | D30 = 13.02 | N18 = 1.496999 | ν18 = 81.5 |
| R31 = −75.605 | D31 = 2.45 | | |
| R32 = −257.822 | D32 = 1.70 | N19 = 1.882997 | ν19 = 40.8 |
| R33 = 29.946 | D33 = 9.02 | N20 = 1.567322 | ν20 = 42.8 |
| R34 = −88.818 | D34 = 0.17 | | |
| R35 = 59.651 | D35 = 7.00 | N21 = 1.487490 | ν21 = 70.2 |
| R36 = −60.158 | D36 = 2.02 | | |
| R37 = −34.452 | D37 = 2.00 | N22 = 1.882997 | ν22 = 40.8 |
| R38 = −141.781 | | | |

| | FOCAL DISTANCE | | |
|---|---|---|---|
| VARIABLE SPACE | 28.90 | 100.10 | 271.99 |
| D5 | 2.47 | 41.93 | 69.87 |
| D14 | 34.37 | 12.17 | 1.00 |
| D20 | 0.99 | 3.17 | 3.40 |
| D23 | 1.67 | 10.87 | 19.37 |
| D28 | 23.55 | 7.02 | 3.14 |

| ASPHERIC SURFACE FACTOR | |
|---|---|
| SIXTH SURFACE: | A = 0.00000e+00  B = 7.75987e−06 |
| | C = −3.31277e−09  D = −3.67267e−12 |
| | E = 1.04312e−13  F = 0.00000e+00 |
| 23RD SURFACE: | A = 0.00000e+00  B = 4.18192e−06 |
| | C = 7.78627e−11  D = 4.12573e−12 |
| | E = 0.00000e+00  F = 0.00000e+00 |
| 28TH SURFACE: | A = 0.00000e+00  B = −9.14039e−07 |
| | C = −3.19431e−10  D = −3.55053e−13 |
| | E = 0.00000e+00  F = 0.00000e+00 |

TABLE 1

| CONDITIONAL EXPRESSION | FIRST NUMERICAL EXAMPLE | SECOND NUMERICAL EXAMPLE | THIRD NUMERICAL EXAMPLE | FOURTH NUMERICAL EXAMPLE | FIFTH NUMERICAL EXAMPLE |
|---|---|---|---|---|---|
| (1) \|fis\|/ft | 0.172 | 0.153 | 0.172 | 0.168 | 0.184 |
| (2) fRB2/ft | 0.293 | 0.250 | 0.286 | 0.273 | 0.313 |
| (3) fRB1t/ft | 0.109 | 0.109 | 0.105 | 0.108 | 0.117 |
| (4) f1/ft | 0.426 | 0.440 | 0.425 | 0.430 | 0.454 |
| (5) \|f2\|/ft | 0.062 | 0.063 | 0.060 | 0.061 | 0.065 |

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-052205 filed Feb. 26th, 2004, which is hereby incorporated by reference herein.

The invention claimed is:

1. A zoom lens system comprising:
   a plurality of lens units, including:
      a first lens unit with positive optical power;
      a second lens unit with negative optical power;
      a third lens unit with positive optical power;
      a fourth lens unit with positive optical power;
      a fifth lens unit with negative optical power; and
      a sixth lens unit with positive optical power,
   wherein the first through sixth lens units are disposed from the object side to the image side along the optical axis, respectively,
   wherein spaces are provided between adjacent lens units,
   wherein during a zooming operation, the spaces change,
      wherein the fifth lens unit is movable so as to have a direction perpendicular to the optical axis, and
   wherein a focal distance fis of the fifth lens unit and a focal distance ft of the zoom lens system at a telephoto end satisfy the following condition:
   $0.05 < |fis|/ft < 0.25$, wherein a focal distance fRB2 of the sixth lens unit satisfies the following condition:

$0.2 < fRB2/ft < 0.5$.

2. The system according to claim 1, wherein a composite focal distance fRB1t of the third lens unit and the fourth lens unit at the telephoto end satisfies the following condition:

$0.05 < fRB1t/ft < 0.2$.

3. The system according to claim 1, wherein a focal distance f1 of the first lens unit and a focal distance f2 of the second lens unit satisfy the following conditions:

$0.2 < f1/ft < 0.6$, and $0.03 < |f2|/ft < 0.1$.

4. The system according to claim 1, wherein the zoom lens system forms an image on a solid imaging element.

5. An imaging apparatus comprising:
   a solid imaging element; and
   the zoom lens system according to claim 1 forming images on the solid imaging element.

6. A zoom lens system comprising:
   a plurality of lens units, including:
      a first lens unit with positive optical power;
      a second lens unit with negative optical power;
      a third lens unit with positive optical power;
      a fourth lens unit with positive optical power;
      a fifth lens unit with negative optical power; and
      a sixth lens unit with positive optical power,
   wherein the first through sixth lens units are disposed from the object side to the image side along the optical axis, respectively,
   wherein spaces are provided between adjacent lens units,
   wherein during a zooming operation, the spaces change,
      wherein the fifth lens unit is movable so as to have a direction perpendicular to the optical axis, and
   wherein a focal distance fis of the fifth lens unit and a focal distance ft of the zoom lens system at a telephoto end satisfy the following condition:
   $0.05 < |fis|/ft < 0.25$, wherein a composite focal distance fRB1t of the third lens unit and the fourth lens unit at the telephoto end satisfies the following condition:

$0.05 < fRB1t/ft < 0.2$.

* * * * *